(12) United States Patent
Edelstein

(10) Patent No.: US 12,545,908 B2
(45) Date of Patent: Feb. 10, 2026

(54) METHODS FOR TRAPPING AND BARCODING DISCRETE BIOLOGICAL UNITS IN HYDROGEL

(71) Applicant: SCIPIO BIOSCIENCE, Montrouge (FR)

(72) Inventor: Stuart Edelstein, Paris (FR)

(73) Assignee: SCIPIO BIOSCIENCE, Montrouge (FR)

( * ) Notice: Subject to any disclaimer, the term of this patent is extended or adjusted under 35 U.S.C. 154(b) by 835 days.

(21) Appl. No.: 15/971,417

(22) Filed: May 4, 2018

(65) Prior Publication Data

US 2018/0320173 A1    Nov. 8, 2018

Related U.S. Application Data

(60) Provisional application No. 62/502,180, filed on May 5, 2017.

(51) Int. Cl.
| | | |
|---|---|---|
| *C12N 15/10* | (2006.01) | |
| *A61K 47/06* | (2006.01) | |
| *A61K 47/69* | (2017.01) | |
| *C12Q 1/682* | (2018.01) | |
| *C12Q 1/6823* | (2018.01) | |
| *C12Q 1/6869* | (2018.01) | |
| *C12Q 1/6876* | (2018.01) | |
| *C12Q 1/6809* | (2018.01) | |

(52) U.S. Cl.
CPC .......... *C12N 15/1096* (2013.01); *A61K 47/06* (2013.01); *A61K 47/6903* (2017.08); *C12Q 1/682* (2013.01); *C12Q 1/6823* (2013.01); *C12Q 1/6869* (2013.01); *C12Q 1/6876* (2013.01); *C12Q 1/6809* (2013.01); *C12Q 2563/179* (2013.01); *C12Q 2563/185* (2013.01)

(58) Field of Classification Search
CPC ............ A61K 47/6903; C12N 15/1096; C12Q 1/6876; C12Q 2563/179; C12Q 2563/185
See application file for complete search history.

(56) References Cited

U.S. PATENT DOCUMENTS

| | | |
|---|---|---|
| 10,428,326 B2 | 10/2019 | Belhocine et al. |
| 2010/0178655 A1 | 7/2010 | Hamilton et al. |
| 2011/0160078 A1 | 6/2011 | Fodor et al. |
| 2014/0155295 A1* | 6/2014 | Hindson ............ C12N 15/1065 506/16 |
| 2015/0018236 A1* | 1/2015 | Green ................ C12N 15/1086 506/10 |
| 2015/0066385 A1 | 3/2015 | Schnall-Levin et al. |
| 2015/0253237 A1* | 9/2015 | Castellarnau ....... G01N 15/1463 506/37 |
| 2015/0329891 A1* | 11/2015 | Tan ..................... C12P 19/34 435/91.1 |
| 2015/0376609 A1* | 12/2015 | Hindson ............... C40B 50/16 506/4 |
| 2016/0053253 A1 | 2/2016 | Salathia et al. |
| 2016/0060621 A1 | 3/2016 | Agresti et al. |
| 2016/0257993 A1 | 9/2016 | Fu et al. |
| 2016/0265069 A1 | 9/2016 | Fan et al. |
| 2016/0289669 A1 | 10/2016 | Fan et al. |
| 2016/0289740 A1 | 10/2016 | Fu et al. |
| 2018/0250672 A1 | 9/2018 | Jamshidi et al. |

FOREIGN PATENT DOCUMENTS

| | | | |
|---|---|---|---|
| WO | 2005003304 A2 | 1/2005 | |
| WO | WO-2012048341 A1 * | 4/2012 | ............ C07H 21/04 |
| WO | 2014093676 A1 | 6/2014 | |
| WO | 2014124338 A1 | 8/2014 | |
| WO | 2014189957 A2 | 11/2014 | |
| WO | 2015095226 A2 | 6/2015 | |
| WO | 2015126766 A1 | 8/2015 | |
| WO | 2015200541 A1 | 12/2015 | |
| WO | 2015200869 A1 | 12/2015 | |
| WO | 2016003814 A1 | 1/2016 | |
| WO | 2016040476 A1 | 3/2016 | |
| WO | 2016061517 A2 | 4/2016 | |
| WO | 2016118915 A1 | 7/2016 | |
| WO | 2016130704 A2 | 8/2016 | |
| WO | 2017075265 A1 | 5/2017 | |

OTHER PUBLICATIONS

Written Opinion issued in Application No. PCT/IB2018/000612, dated Aug. 21, 2018.
International Search Report issued in Application No. PCT/IB2018/000612, dated Aug. 21, 2018.
Adey, A. et al., "Rapid, Low-Input, Low-Bias Construction of Shotgun Fragments Libraries by High-Density In Vitro Transpostion," Genome Biology, 2010, 11(12), pp. 1-17.
Amini, S., et al., "Haplotype-Resolved Whole-Genome Sequencing by Contiguity-Preserving Transposition and Combinatorial Indexing," Nature Genetics, 2014, 46(12), pp. 1-9.
Bigdeli, S. et al., "A Simple Method for Encapsulating Single Cells in Alginate Microspheres Allows for Direct PCR and Whole Genome Amplification," PLoS One, 2015, 10(2), pp. 1-15.
Borgström, E., et al., "Phasing of Single DNA Molecules by Massively Parallel Barcoding," Nature Communications, 2015, pp. 1-6.
Bose, S., et al., "Scalable Microfluidics for Single-Cell RNA Printing and Sequencing," Genome Biology, 2015, 16:120, pp. 1-16.
Buentostro, J., et al., "Transposition of Native Chromatin for Fast and Sensitive Epigenomic Profiling of Open Chromatin, DNA-binding Proteins and Nucleosome Position," Nature Methods, 2013, pp. 1-8.
Buenrostro, J., et al., "Single-Cell Chromatin Accessibility Reveals Principles of Regulatory Variation," Nature 2015, pp. 1-15.

(Continued)

*Primary Examiner* — Sahana S Kaup
(74) *Attorney, Agent, or Firm* — NIXON & VANDERHYE

(57) ABSTRACT

Disclosed are methods for trapping and barcoding discrete biological units in a hydrogel. Also disclosed are methods for analyzing gene expression, genotype, haplotype or epigenome in discrete biological units, as well as kits for implementing the methods of the present disclosure.

13 Claims, 9 Drawing Sheets

Specification includes a Sequence Listing.

(56) References Cited

OTHER PUBLICATIONS

Christiansen, L., et al., "Contiguity-Preserving Transposition Sequencing (CPT-Seq) for Genome-Wide Haplotyping, Assembly, and Single-Cell ATAC-Seq," Haplotyping: Methods and Protocols, Methods in Molecular Biology, 2017, 1551, pp. 207-221.
Fan, C.H., et al., "Combinatorial Labeling of Single Cells for Gene Expression Cytometry," Science, 2015, 347(6222), pp. 1258367-1258367-8.
Gertz, J., et al., "Transposase Mediated Construction of RNA-Seq Libraries," Genome Research, 2012, 22(1), pp. 134-141.
Gierahn, T.M., et al., "Seq-Well: Portable, Low-Cost RNA Sequencing of Single Cells at High Throughput," Nature Methods, 2017. Nat Methods. 14(4):395-398.
Gole, J., et al., "Massively Parallel Polymerase Cloning and Genome Sequencing of Single Cells Using Nanoliter Microwells," Nature Biotechnology, 2013, pp. 1-9.
Hutchinson III, C.A., et al., "Cell-Free Cloning Using Φ29 DNA Polymerase," PNAS, 2005, vol. 102, No. 48, pp. 17332-17336.
Islam, S., et al., "Quantitative Single-Cell RNA-Seq with Unique Molecular Identifiers," Nature Methods, 2014, vol. 11. No. 2, pp. 163-166.
Jaitin, D.A., et al., "Massively Parallel Single-Cell RNA-Seq for Marker-Free Decomposition of Tissues into Cell Types," Science, 2014, 343(6172), pp. 776-779.
Kaper, F. et al., "Whole-Genome Haplotyping by Dilution, Amplification, and Sequencing," PNAS, 2013, 110(14), pp. 5552-5557.
Klein, A.M., et al., "Droplet Barcoding for Single-Cell Transcriptomics Applied to Embryonic Stem Cells," Cell, 2015, 161(5), pp. 1187-1201.
Kuleshov, V., et al., "Whole-Genome Haplotyping Using Long Reads and Statistical Methods," Nature Biotechnology, 2014, 32(3), pp. 261-266.
Lan, F., et al., "Droplet Barcoding for Massively Parallel Single-Molecule Deep Sequencing," Nature Communications, 2016, 7, pp. 1-10.
Leung, K., et al., "Robust High-Performance Nanoliter-Volume Single-Cell Multiple Displacement Amplification on Planar Substrates," PNAS, 2016, 113(30), pp. 8484-8489.
Lu, S. et al., "Probing Meiotic Recombination and Aneuploidy of Single Sperm Cells by Whole-Genome Sequencing," Science, 2012, 338(6114), pp. 1627-1630.
Macosko, E.Z., et al., "Highly Parallel Genome-Wide Expression Profiling of Individual Cells Using Nanoliter Droplets," Cell, 2015, pp. 1202-1214.
Marcy, Y., et al., "Nanoliter Reactors Improve Multiple Displacement Amplification of Genomes from Single Cells," PLOS Genetics, 2007, 3(9), pp. 1702-1708.
Peters, B.A., et al., "Accurate Whole-Genome Sequencing and Haplotyping from 10 to 20 Human Cells," Nature, 2012, 487(7406), pp. 190-195.
Vitak, S.A., et al., "Sequencing Thousands of Single-Cell Genomes with Combinatorial Indexing," Nature Methods, 2017, 14(3), pp. 1-10.
Wang, J., et al., "Genome-Wide Single-Cell Analysis of Recombination Activity and De Novo Mutation Rates in Human Sperm," Cell, 2012, 150(2), pp. 402-412.
Yuan, J., et al., "An Automated Microwell Platform for Large-Scale Single Cell RNA-Seq," Scientific Reports, 2016, pp. 1-10.
Zahn, H., et al., "Scalable Whole-Genome Single-Cell Library Preparation Without Preamplification," Nature Methods, 2017, 14(2), pp. 1-10.
Zhang, K., et al., "Sequencing Genomes from Single Cells by Polymerase Cloning," Nature Biotechnology, 2006, 24(6), pp. 680-686.
Zheng, G., et al., "Haplotyping Germline and Cancer Genomes with High-Throughput Linked-Read Sequencing," Nature Biotechnology, 2016, 34(3), pp. 1-11.
Zhu, Z., et al., Hydrogel Droplet Microfluidics for High-Throughput Single Molecule/cell Analysis, Accounts of Chemical Research, 2017, 50(1), pp. 22-31.
Zong, C., et al., "Genome-Wide Detection of Single-Nucleotide and Copy-Number Variations of a Single Human Cell," Science, 2012, 338(6114), pp. 1622-1626.

* cited by examiner

METHODS FOR TRAPPING AND BARCODING DISCRETE BIOLOGICAL UNITS IN HYDROGEL

FIELD OF INVENTION

The present invention relates to methods for trapping and barcoding discrete biological units in a hydrogel. In particular, the present invention relates to methods for discrete biological units' expression analysis, and kits for implementing the methods of the present invention. The methods of the present invention can further be used for single-cell transcriptome profiling, genotyping, phasing and/or haplotyping.

BACKGROUND OF INVENTION

To derive Next Generation Sequencing (NGS) analysis, three tasks must occur: 1) sample preparation (sample prep), 2) sequencing and 3) bioinformatics. Microfluidics has been exploited to improve the first of the three requirements, sample prep, specifically by enabling high throughout (HT) parallelization of reactions and efficiencies of scale. One application that has an acute need for HT microfluidic sample prep is single cell gene explosion analysis by RNA sequencing (single cell RNAseq). The reason for this is that the number of cells to be analyzed can range front hundreds to thousands and each workflow starts by first isolating single cells in individual reaction chambers. Thus, the HT parallelization reaction capacity of any microfluidic platform needs to match these cell number requirements.

The first microfluidic platform to be commercialized for single cell RNAseq analysis was based on PDMS (polydimethylsiloxane) chip technology. Available versions of the platform are able to process tens to hundreds of cells. Cells from a suspension are isolated in nanolitre (nL) volume PDMS chambers and then lysed by the application of a lysis reagent through the opening of valve and access to the appropriate lysis reagent inlet. Valve ripening and selection of specific reagent inlets are done at each subsequent step to consecutively achieve reverse transcription of the mRNA, adaptor sequence addition to the cDNA and PCR. Amplicons from single cell products are then harvested from the chip and processed in bulk in finish sample prep from sequencing. Platforms that use PDMS architecture are limited since they require expensive multilayer PDMS chips and sophisticated pressure and thermal control instrumentation to operate those chips. Moreover, the number of reactions is determined by the smallest PDMS features that can be manufactured. For a reasonably sized chip, this means that no more than 1000 cells can be processed at a given time, which for a large proportion of biological samples, is not sufficient. And even if the throughput is adequate, PDMS infrastructure both from the chip and instrument perspective are prohibitively expensive.

Water in oil droplet emulsions are another form of microfluidics. Compared to PDMS based technology, droplets have the advantage of providing a significant increase in reaction numbers. Throughput is only limited by the emulsion volume and the numbers increase proportionally with decreasing droplet size. The discovery that encapsulating beads coated with clonal oligos that are unique to each bead has enabled parallel molecular encoding of droplet reactions. For example, within the gene expression application space, after cell lysis its droplets, the bead oligos bind to the mRNA and in the process, encode a single cell transcriptome with a common bead molecular tag, otherwise known us a bead barcode. After sequencing, sequences with the same barcode can be grouped together, which effectively reconstructs the prior coupling of a bead and a cell in individual reaction chambers or droplets and enables single cell analysis. The molecular biology steps vary according to various forms of droplet encoding technological platforms. In Drop-SEQ, after binding of the mRNA to the bead oligos in droplets, reverse transcription and subsequent sample preparation steps take place in bulk on broken emulsions. In other commercially available platforms, reverse transcription occurs in droplets, with final sample preparation steps taking place in bulk. Although removing the throughput bottleneck, droplets have other significant drawbacks. First, droplets and their monodisperse formation are incompatible with detergent levels that are used to lyse difficult-to-lyse cells (such as plant cells, certain bacteria, in particular gram$^+$ bacteria, molds, spores, yeasts, mycobacteria, etc.), access nuclei and perform a number of critical molecular biology steps. Second, performing multi-step molecular biology reactions is extremely difficult in droplets. Although possible through droplet merging or pico-injection, for example, multi-step droplet workflows significantly increases the complexity and cost of the microfluidic setup. Third, droplet platforms require high-grade oils, sophisticated chips whose features are difficult to manufacture at industrial scale, and instruments to accommodate and administer precise flow control through those chips. All three elements required for droplet platforms, namely oil, chips, and instruments, create a burden for manufacturing and tech support and, importantly, significantly increase the costs to the end user, thus limiting widespread droplet technology adoption.

The current invention deigned to eliminate the drawbacks of the existing technologies. Indeed, the inventors have surprisingly developed a new method for single cell gene expression analysis, that does not require PDMS chins or droplets, while preserving the key benefit of droplet platforms in being able to process greater than thousands of cells. Based on the use of a hydrogel platform, this new technology also resolves the three key problem associated with droplet technologies. First, any detergent level is supported by the hydrogel platform, creating the possibility of lysing any cell or nuclei, as well as supporting key biochemistry and molecular biology reactions. Second, multistep reactions can be performed with ease since soluble reagents can easily access she reactor space through the hydrogel. Subsequent reactions are performed by simply exchanging the majority solution in contact with the hydrogel. Third, there is no need for expensive oils, chips and/or droplet generation instruments. For automation, an instrument may be used to manage the hydrogel reactor platform, but is not required.

The limitations of PDMS and droplet technologies and the improvements of the hydrogel reactor platform are not restricted to the single cell gene expression space. They apply to any application where the substrate has multiple primer binding sites, such a single cell genomes and long naked DNA molecules that are used as substrates in phasing and genome structure applications. The molecular biology reactions vary according to the identity of the substrate and the output requirements of the sample prep method. However, the foundational methods to trap and barcode biologic at units in hydrogel remains unchanged.

SUMMARY

The present invention relates to a method for trapping discrete biological units in a hydrogel, said method comprising the steps of:

a) contacting a plurality of biological units with a plurality of barcode unit to form biological unit/barcode unit complexes,
b) contacting said biological unit/barcode unit complexes with a hydrogel solution, and
c) polymerizing the hydrogel solution to embed said biological unit/barcode unit completes in a hydrogel matrix.
d) barcoding the biological unit's nucleic acid within each of said biological unit/barcode unit complexes in the hydrogel matrix.

In one embodiment, each barcode unit comprises a unique barcode.

The present invention further relates to a method for analyzing gene expression in discrete biological units, said method comprising the steps of:
a) contacting a plurality of biological units with a plurality of barcode units to form biological unit/barcode unit complexes, wherein each barcode unit comprises a unique barcode, and wherein said barcode units comprise at least one means involved with binding said biological units,
b) contacting said biological unit/barcode unit complexes with a hydrogel solution,
c) polymerizing the hydrogel solution to embed said biological unit/barcode unit complexes in a hydrogel matrix,
d) releasing nucleic acids from each biological unit in the hydrogel matrix,
e) barcoding said nucleic acids from each biological unit in the hydrogel matrix,
f) symbolizing a cDNA library from the nucleic acids from each biological unit,
g) amplifying said cDNA library from each biological unit, wherein amplification of said cDNA library from each biological unit incorporates clonal copies of said unique barcode into the amplification products front each biological unit, and
h) optionally, sequencing the amplification products.

The present invention further relates to a method for analyzing the genotype in discrete biological units, said method comprising the steps of:
a) contacting a plurality of biological units with a plurality of barcode units to form biological unit/barcode unit complexes, wherein each barcode unit comprises a unique barcode, and wherein said barcode units comprise at least one means involved with binding said biological units,
b) contacting said biological unit/barcode unit complexes with a hydrogel solution,
c) polymerizing the hydrogel solution to embed said biological unit/barcode unit complexes in a hydrogel matrix,
d) releasing genomic DNA from each biological unit in the hydrogel matrix,
e) barcoding said genomic DNA from each biological unit in the hydrogel matrix,
f) optionally, synthetizing a DNA library from the nucleic acids from each biological unit,
g) amplifying said genomic DNA or DNA library from each biological unit, wherein amplification of said genomic DNA or DNA library from each biological unit incorporate clonal copies of said unique barcode into the amplification products of each biological unit, and
h) optimally, sequencing the amplification products.

The present invention further relates to a method for analyzing the haplotype of discrete biological units, said method comprising the steps of:
a) contacting a plurality of biological units with a plurality of barcode units to form biological unit/barcode unit complexes, wherein each barcode unit comprises a unique barcode, and wherein said barcode units comprise at least one means involved with binding said biological units,
b) contacting said biological unit/barcode unit complexes with a hydrogel solution,
c) polymerizing the hydrogel solution to embed said biological unit/barcode unit complexes in a hydrogel matrix,
d) optionally, releasing nucleic acids from each biological unit in the hydrogel matrix,
e) barcoding said nucleic acids from each biological unit in the hydrogel matrix,
f) optionally, synthesizing a DNA library from the nucleic acids from each biological unit
g) amplifying said nucleic acid or DNA library from each biological unit, wherein amplification of said nucleic acids or DNA library from each biological unit incorporates clonal copies of said unique barcode into the amplification products from each biological unit, and
h) optionally, sequencing the amplification products.

The present invention further relates to a method for analyzing the epigenome in discrete biological units, said method comprising the steps of:
a) contacting it plurality of cellular biological units with a plurality of barcode units to form biological unit/barcode unit complexes, wherein each barcode unit comprises a unique barcode, and wherein said barcode units comprise at least one means involved with binding said biological units,
b) contacting said biological unit/barcode unit complexes with a hydrogel solution,
c) polymerizing the hydrogel solution to embed said biological unit/barcode unit complexes in a hydrogel matrix,
d) releasing non-nucleosome-bound-DNA from each biological unit in the hydrogel matrix,
e) barcoding said non-nucleosome-bound-DNA from each biological unit in the hydrogel matrix.
f) optionally, synthesizing a DNA library from the non-nucleosome bound DNA from each biological unit,
g) amplifying said non-nucleosome-bound-DNA or DNA library from each biological unit, wherein amplification of said non-nucleosome-bound-DNA or DNA library from each biological unit incorporates clonal copies of said unique barcode into the amplification products from each biological unit, and
h) optionally, sequencing the amplification products.

In one embodiment, the biological units are immobilized on a support. In one embodiment, the barcode units are immobilized on a support.

In one embodiment, the biological units are immobilized on a support in a hydrogel layer. In one embodiment, the barcode units are immobilized on a support in a hydrogel layer.

In one embodiment, the unique barcode is present in multiple clonal copies on each barcode unit.

In one embodiment, the unique barcode comprises a nucleic acid sequence barcode.

In one embodiment, the unique barcode comprises a nucleic acid sequence primer. In one embodiment, the nucleic acid sequence primer comprises random nucleic acid sequence primers. In one embodiment, the nucleic acid sequence primer comprises specific nucleic acid sequence primers.

In one embodiment, the barcode unit comprises at least a means involved with binding biological units. In one embodiment, the at least a means involved with binding biological units comprises proteins, peptides and/or fragments thereof; antibodies and/or fragments thereof; nucleic acids; carbohydrates; vitamins and/or derivatives thereof; coenzymes and/or derivatives thereof; receptor ligands and/or derivatives thereof; and/or hydrophobic groups.

In one embodiment, each barcode unit consists of bead.

In one embodiment, the step of barcoding is carried out in the hydrogel matrix by primer template annealing. In one embodiment, the step of barcoding is carried out in the hydrogel matrix by primer-directed extension. In one embodiment, the step of barcoding is carried out in the hydrogel matrix by ligation.

In one embodiment, discrete biological units comprise cells, groups of cells, viruses, nuclei, mitochondria, chloroplasts, biological macromolecules, exosomes, chromosomes, contiguity preserved transposition DNA fragments and/or nucleic acid fragments.

In one embodiment, cells or groups of cells comprise cells in vitro culture, stem cells, row cells, tissue biopsy cells, blood cells and tissue section cells.

The present invention further relates to a kit comprising:
a plurality of barcode units, wherein said barcode units comprise at least a means involved with binding biological units and wherein each barcode unit comprises a unique barcode;
a hydrogel solution and/or hydrogel monomers for preparing a hydrogel solution;
optionally, a support for binding biological units and/or barcode units;
reagents and solutions for biochemistry and molecular biology assays;
instructions for use.

The present invention further relates to a kit comprising:
a support comprising a plurality of pre-bound barcode units, wherein said barcode units comprise at least a means invoked with binding biological units and wherein each barcode unit comprises a unique barcode;
a hydrogel solution and/or hydrogel monomers for preparing a hydrogel solution;
reagents and solutions for biochemistry and molecular biology assays;
instructions for use.

DEFINITIONS

In the present invention, the following terms have the following meanings:

The term "about" or "approximately" can mean within an acceptable error range for the particular value as determined by one of ordinary skill in the art, which will depend in past on how the value is measured or determined, i.e., the limitations of the measurement system. For example, "about" can mean within 1 or more than 1 standard deviation, per the practice in the art. Alternatively, "about" preceding a figure means plus or less 10% of the value of said figure. Alternatively, particularly with respect to biological systems or processes, the term can mean within an order of magnitude, within 5-fold, and more preferably within 2-fold, of a value. Where particular values are described in the application and claims, unless otherwise stated the term "about" meaning within an acceptable error range for the particular value should be assumed.

The term "amplification" refers to the process of producing multiple copies, i.e., at least 2 copies, of a desired template sequence. Techniques to amplify nucleic acids are well known to the skilled artisan, and include specific amplification methods as well as random amplification method.

The term "A-tailing" refers to an enzymatic method for adding a non-templated A nucleotide to the 3' end of a blunt, double-stranded DNA molecule.

The term "barcode" refers to a molecular pattern which can be used as a unique identifier, to uniquely identify a discrete biological unit. The term "barcode" further refers to the molecular pattern which is used to identify the source or origin of an analyte within a sample, such as for example, a nucleic acid sequence extracted or derived from a discrete biological unit.

The term "barcode unit" refers to as identifiable substrate or matrix upon which a biological unit can be bound or immobilized. The barcode unit may be rigid, solid or semi-solid.

The term "barcoding" refers to the attachment of a discrete barcode unit's barcode, preferably a nucleic acid barcode, to the biological unit template nucleic acid sequences through printer template annealing, primer dependent DNA synthesis and/or ligation.

The term "bead" refers to a discrete particle that may be spherical (e.g. microspheres) or have an irregular shape. Beads may be as small as about 0.1 µm in diameter or as large as about several millimeters in diameter.

The term "biological unit" refers to discrete biological structures and portions, components or combinations of biological structures. Examples of biological units include, but are not limited to, a cell or a group of cells, a virus, an organelle such as a nucleus, a mitochondrion or a chloroplast, a macromolecular complex such as an exosome, a biological macromolecule such as a chromosome, a nucleic acid fragment, a contiguity preserved transposition DNA (CPT-DNA) fragment, a protein or a peptide.

The term "carbohydrate" refers to any of a class of organic compounds with the general formula $Cx(H_2O)y$. Carbohydrates include sugars, starches, celluloses, and gums. A carbohydrate may be a monosaccharide, a disaccharide, or a polysaccharide. Carbohydrates may be naturally occurring or synthetic.

A monosaccharide is a monomer, or simple sugar, having a single chain or a single ring structure. Monosaccharides can be further classified by their structure and the number of carbon atoms in the ring or chain, such as aldoses, ketoses, pyranoses, furanoses, trioses, tetroses, pentoses, hexoses, and heptoses, among others. Examples of monosaccharides include, but are not limited to, N-acetylglucosamine, allose, altrose, arabinose, deoxyribose, dihydroxyacetone, erythrose, fructose, fucose, α-L-fucopyranose, galactose, β-D-galactopyranose, galacturonic acid, glucose (dextrose), glucuronic acid, glyceraldehyde, gulose, idose, lyxose, mannose, α-D-mannopyranose, mannuronic acid, neuraminic acid, psicose, rhamnose, ribose, ribulose, sorbose, tagatose, threose, xylose, and xylulose.

Disaccharides are formed from two monosaccharides joined by glycosidic bonds, Examples of disaccharides include, but are not limited to, cellobiose, gentiobiose, isomaltose, lactose, lactulose, laminaribiose, maltose, mannobiose, melibiose, nigerose, rutinose, sucrose, trehalose, and xylobiose.

Polysaccharides are polymers formed from two or more monosaccharides joined by glycosidic bonds. Polysaccharides formed from 3-10 monosaccharides are often called oligosaccharides. Examples of polysaccharides include, but are not limited to, agarose, alginate, amylopectin, amylose, carageenan, cellulose, chitin, chitohexanose, chitosan, chondroitin suflate, curdlan, dermatan sulfate, dextran, dextrin, emulsan, furcellaran, galactomannan, glucomannan, gellan gum, glucosamine, glycogen, glycoaminoglycan, guar gum, gum arabic, heparan sulfate, heparin, hyaluronic acid, deacylated hyaluronic acid, inulin, isomaltulose, karaya gum, keratan sulfate, laminaran, locust bean gum, muramic acid, pectic acid, pectin, pullulan, pustulan, rhamsan gum, schizophyllan, scleroglucan, stachyose, starch, tragacant gum, welan gum, xanthan, and xanthan gum.

As used herein, the term "carbohydrate" also refers to "glycoconjugates, " which are carbohydrates covalently bonded to other chemical species such as, for example. proteins and lipids. Examples of glycoconjugates include, but are not limited to, glycolipids, glycopeptides, glycoproteins, lipopolysaccharides, and peptidoglycans, The term "cDNA library" refers to a library composed of complementary DNAs which are reverse-transcribed from mRNAs.

The terms "cell" and "group of cells" include, but are not limited to, cells in in vitro culture; stem cells such as embryonic stem cells, adult stem cells, cancer stem cells, induced pluripotent stem cells or induced stem cells; tumor cells such as neoplastic cells; tissue biopsy cells; blood cells such as erythrocytes, leukocytes, mast cells, macrophages, thrombocytes or progenitor ceils thereof; and tissue section cells.

The term "clonal copies" refers to a population of identical copies of a single barcode.

The terms "coat" and "coaling" refer to the covering, modification or functionalization of a substrate, e.g., of a support and/or of a barcode unit.

The term "coenzyme" refers to a non-protein element binding to an apoenzyme, which is a factor assisting an enzyme reaction by changing a chemical structure during an enzyme reaction and delivering functional elements such as atoms or electrons to a reaction substrate. The "coenzyme" may also be referred to as a "cofactor" or "helper enzyme".

Examples of coenzymes include, but are not limited to, nicotinamide adenine dinucleotide (NAD), NADH, nicotinamide adenine dinucleotide phosphate (NADP). NADPH, adenosine triphosphate (ATP), phosphoadenylyl sulfate (PAPS), uridine diphosphate (UDP), cytidine diphosphate (CDP), guanosine triphosphate (GTP), inosine triphosphate (ITP), thiamine pyrophosphate (TPP), flavin mononucleotide (FMM), flavin adenine dinucleotide (FAD), coenzyme-A (CoA), biocytin, tetrahydrofolic acid, coenzyme B12, lipoyllysine, 1,1-cis-retinal and 1,2,5-dihydroxycholecalciferol.

The terms "complement" or "complementary" refer to a polynucleotide sequence capable of forming base pairing by hydrogen bonds with another polynucleotide sequence. For example, guanine (G) is the complementary base cytosine (C), and adenine (A) is the complementary base of thymine (T) and of uracil (U).

The term "contiguity" refers to a spatial relationship between two or more DNA fragments based on shared information. The shared aspect of the information can be with respect to adjacent, compartmental and distance spatial relationships. Information regarding these relationships in turn facilitates hierarchical assembly or mapping of sequence reads derived from the DNA fragments. This contiguity information improves the efficiency and accuracy of such assembly or mapping because traditional assembly or mapping methods used in association with conventional shotgun sequencing do not take into account the relative genomic origins or coordinates of the individual sequence reads as they relate to the spatial relationship between the two or more DNA fragments from which the individual sequence reads were derived.

The term "copy of a desired template sequence" does not necessarily mean perfect sequence complementarity or identity to the template sequence. Copies can include, e.g., nucleotide analogs such as deoxyinosone, intentional sequence alterations and/or sequence errors that occur during amplification. In one embodiment, a copy of a desired sequence is at least about 50%, at least about 60%, at least about 70%, at least about 80%, at least about 90%, at least about 95%, at least about 96%, at least about 97%, at least about 98%, at least about 99%, at least about 100% identical to the template sequence.

The term "detergent" refers to molecules having lipophilic as well as hydrophilic (i.e., amphiphilic) characteristics. Detergents are classified into four broad groupings, depending on the electrical charge of the surfactants:

(1) Anionic detergents refer to detergents with a negative ionic charge. Examples of anionic detergents include, but are not limited to, sodium dodecyl sulfate (SDS), N-laurylsarcosine (sarcosyl), sodium cholate, sodium deoxycholate, sodium glycocholate, sodium taurocholate, sodium taurodeoxycholate and lithium dodecyl sulfate (LDS).

(2) Cationic detergents refer to detergents with a positive ionic charge. Examples of cationic detergents include, but are not limited to, quaternary ammonium salts, amines with amide linkage, polyoxyethylene alkyl and alicyclic amines, N,N,N',N'tetrakis substituted ethylenediamines, 2-alkyl 1-hydroxyethyl 2 imidazoline ethoxylated amines and alkyl ammonium salts.

(3) Non-ionic detergents refer to detergents which do not have any ionic groups, Examples of nonionic detergents include, but are not limited to, polysorbates, octylphenol ethoxylates, glucamines, Lubrol, Brij, Nonidet, poloxamers, Genapol and Igepal.

Examples of polysorbates include, but are not limited to, polysorbate 20 (Tween 20), polysorbate 40 (Tween 40), polysorbate 60 (Tween 60), polysorbate 65 (Tween 65), polysorbate 80 (Tween 80) and polysorbate 85 (Tween 85).

Examples of octylphenol ethoxylates include, but are not limited to, Triton X-15, Triton X-35, Triton X-45, Triton X-100, Triton X-102, Triton X-114, Triton X-165 (70%), Triton X-305 (70%), Triton X-405 (70%) and Triton X-705 (70%).

Examples of glucamines include, but are not limited to, N-octanoyl-N-methylglucamine (MEGA-8), N-nonanoyl-N-methylglucamine (MEGA-9) and N-decanoyl-N-methylglucamine (MEGA-10).

Examples of Lubrol include, but are not limited to, Lubrol WX, Lubrol PX, Lubrol 12A9, Lubrol 17A10, Lubrol 17A17, Lubrol N13 and Lubrol G.

Examples of Brij include, but are not limited to, Brij 35, Brij 58, Brij 93, Brij 97, Brij C2, Brij S2, Brij L4, Brij C10, Brij O10, Brij S10, Brij O20, Brij S20, Brij L23 and Brij S100.

Examples of Nonidet include, but are not limited to, Nonidet P40.

Examples of poloxamer include, but are not limited to, poloxamer 124, poloxamer 181, poloxamer 182, poloxamer 184, poloxamer 188 (Pluronic F68), poloxamer 331, poloxamer 407 (Pluronic F127)

Examples of Genapol include, but are not limited to, Genapol X-080, Genapol X-100 and Genapol C-100.

Examples of Igepal include, but are not limited to, Igepal CA-210, Igepal CA-520, Igepal CA-630, Igepal CA-720, Igepal CO-520, Igepal CO-630, Igepal CO-720, Igepal CO-890 and Igepal DM-970.

(4) Zwitterionic detergents refer to detergents which have ionic groups, but no net charge. Examples of zwitterionic detergents include, but are not limited to, amidosulfobetaines, alkylbetaines and ammonio propanesulfonates such as amidosulfobetaine-14, amidosulfobetaine-16, 3-[(3-cholamidopropyl)dimethylammonio]-1-propanesulfonate (CHAPS), 3-[(3-cholamidopropyl)dimethylammonio]-2-hydroxy-1-propanesulfonate (CHAPSO), 3-(4-heptyl)phenyl-3-hydroxypropyl)dimethylammoniopropanesulfonate (C7BzO), EMPIGEN® BB, 3-(N,N-dimethyloctylammonio)propanesulfonate inner salt, 3-(decyldimethylammonio)propanesulfonate inner salt, 3-(dodecyldimethylammonio) propanesulfonate inner salt, 3-(N,N-dimethylmyristylammonio)propanesulfonate inner salt, 3-(N,N-dimethylpalmitylammonio)propanesulfonate inner salt, 3(N,N-dimethyloctoadecylammonio)propanesulfonate inner salt.

The term "epigenome" refers to all the chemical changes to the DNA and/or histone proteins of a cell, and responsible for gene expression regulation, development, differentiation and suppression of transposable elements.

The term "genome structure" refers to the order, numbers and presence of genetic units (such as loci, genes and the like positioned along a chromosome.

The term "haplotype" refers to a group of genes from different loci on a single chromosome that are inherited together from a single parent. Haplotype information contributes to the understanding of the potential functional effects of gene various on the same (in cis) or allelic (in trans) strand of DNA.

The terms "hydrogel" refers to a hydrophilic, high water-content, network of polymers, with physical or chemical crosslinks. Hydrogels are typically found in two states, depending among others on the extent of cross-linking: a sol state and a gel state. In the sol state, the hydrogel behaves as a liquid, while in the gel state, the hydrogel does not exhibit flow. As will clearly appear to the skilled person, while the hydrogel max already be a polymer in sol state, the terms "polymerizing the hydrogel" are used herein to designate the polymerization and/or crosslinking required to achieve sol to gel transition.

The form "hydrogel matrix" refers to the physical structure of the hydrogel in gel state, i.e. the crosslinked network of polymers that achieves the desired porosity for the purpose of the invention, as further disclosed herein.

The term "identity", when used in a relationship between the sequences of two or more nucleic acids sequences, refers to the degree of sequence relatedness between nucleic acids, as determined by the number of matches between strings of two or more nucleotide residues. "Identity" measures the percent of identical matches between the smaller of two or more sequence with gap alignments (if any) addressed by a particular mathematical model or computer program (i.e., "algorithms"). Identity of related nucleic acid sequences can be readily calculated by known methods. Such methods include, but are not limited to, those described in Lesk, Arthur M. (1988), "Computational molecular biology". New York, N.Y.: Oxford University Press; Smith, Douglas W. (1993), "Biocomputing: informatics and genome projects". New York, N.Y.: Academic Press; Griffin, Annette M., and Hugh G. Griffin (1994), "Computer analysis of sequence data, part 1", Totowa, N.J.: Humana; von Heinje, Gunnar (1987), "Sequence analysis in molecular biology: treasure trove or trivial pursuit", Academic Press; Gribskov, Michael, and John Devereux (1991), "Sequence analysis primer", New York, N.Y.; M. Stockton Press; Carillo et al., 1988. SIAM *J. Applied Math.* 48:1073. Preferred methods for determining identity are designed to give the largest match between the sequences tested. Methods of determining identity are described in publicly available computer programs. Preferred computer program methods for determining identity between two sequences include the GCG program package, including GAP (Devereux et al., 1984. *Nucl Acid Res.* 2:387; Genetics Computer Group, University of Wisconsin, Madison, Wis.), BLASTN, and FASTA (Altschul et al., 1990. *J Mol Biol.* 215:403-410). The BLASTX program is publicly available from the National Center for Biotechnology Information (NCBI) and other sources (BLAST manual; Altschul et al. NCB/NLM/NIH Bethesda, Md. 20894; Altschul et al., 1990. *J Mol Biol.* 215:403-410). The well-known Smith Waterman algorithm may also be used to determine identity.

The forms "kit" and "kit-of-parts" refer to any manufacture (e.g., a package or at least one container) comprising the different reagents necessary for carrying out the methods according to the present invention, packed so as to allow their transport and storage. The terms "kit" and "kit-of-parts" shall encompass an entity of physically separated components, which are intended for individual use, but in functional relation to each other. A kit may be promoted, distributed, or sold as a unit for performing the methods of the present invention. Furthermore, any or all of the kit reagents max be provided within containers that protect them from the external environment, such as in sealed and sterile containers. The kit may also contain a package insert describing the kit and methods for its a use.

The terms "ligation" refers to the process of joining DNA molecules together with covalent bonds. For example, DNA ligation involves creating a phosphodiester bond between the 3' hydroxyl of one nucleotide and the 5' phosphate of another. Ligation is preferably carried out at temperature ranging from about 4 to about 37° C. in the presence of a ligase enzyme. Examples of suitable ligases include *Thermus thermophilus* ligase, *Thermus acquatics* ligase, *E. coli* ligase, T4 ligase, and *Pyrococcus* ligase.

The term "lysate" refers to a liquid or solid collection of materials following a biological unit's lysis procedure.

The term "lysis" or "lyse" refers to the disruption of a biological unit in order to gain access to materials that are otherwise inaccessible. When the biological unit is a cell, lysis refers to breaking the cellular membrane of the cell, allowing transfer of reagents into the cell through cellular membrane holes and/or causing the cellular contents to spill out. Lysis methods are well-known to the skilled artisan, and include, but are not limited to, proteolytic lysis, chemical lysis, thermal lysis, mechanical lysis, and osmotic lysis.

The terms "nucleic acid sequence primer" or "primer" refer to an oligonucleotide that is capable of hybridizing or annealing with a nucleic acid and serving as an initiation site for nucleotide polymerization under appropriate conditions, such as the presence of nucleoside triphosphates and an enzyme for polymerization, such as DNA or RNA polymerase or reverse transcriptase, in an appropriate buffer and at a suitable temperature.

The term "oligonucleotide" refers to a polymer of nucleotides, generally to a single-stranded polymer of nucleotides. In some embodiments, the oligonucleotide comprises front 2 to 500 nucleotides, preferably from 10 to 150 nucleotides, preferably from 20 to 100 nucleotides. Oligonucleotides may be synthetic or may be made enzymatically. In some embodiments, oligonucleotides may comprise ribonucleotide monomers, deoxyribonucleotide monomers, or a mix of both.

The terms "PCR handle sequence" and "universal tag sequence" are interchangeable, and refer to a nucleic acid sequence useful for enabling amplification, preferably PCR amplification and further sequencing of nucleic acid sequences extracted or derived from the biological units. In one embodiment, the PCR handle lacks homology with the template sequence. In one embodiment, the PCR handle sequence is common for the entire sample preparation workflow.

The term "phasing" refers to the identification of the individual complement of homologous chromosomes.

The terms "polishing" or "blunting" refer to the elimination of incompatible 3' or 5' DNA overhangs for the promotion of blunt-end ligation. Several techniques well-known front the skilled artisan may be used for DNA end polishing. For example, terminal unpaired nucleotides may be removed from DNA ends by using an enzyme with exonuclease activity, which hydrolyzes a terminal phosphodiester bond, thereby removing the overhung one base at a time. DNA fragments with 5' overhangs may be blunted by filling in it recessed 3' terminus with DNA polymerase in the presence of dNTPs. End removal or fill-in can be accomplished using a number of enzymes, including DNA Polymerase I Large (Klenow) Fragment, T4 DNA Polymerase or Mung Bean Nuclease.

The terms "polymerase chain reaction" or "PCR" encompass methods including, but not limited to, allele-specific PCR, asymmetric PCR, hot-start PCR, intersequence-specific PCR, methylation-specific PCR, miniprimer PCR, multiplex ligation-dependent probe amplification, multiplex-PCR, nested PCR1 quantitative PCR, reverse transcription PCR and/or touchdown PCR. DNA polymerase enzymes suitable to amplify nucleic acids comprise, but are not limited to, Taq polymerase Stoffel fragment, Taq polymerase, Advantage DNA polymerase, AmpliTaq, AmpliTaq Gold, Titanium Taq polymerase, KlenTaq DNA polymerase, Platinum Taq polymerase, Accuprime Taq polymerase, Pfu polymerase, Pfu polymerase turbo, Vent polymerase, Vent exo-polymerase, Pwo polymerase, 9 Nm DNA polymerase, Therminator, Pfx DNA polymerase, Expand DNA polymerase, rTth DNA polymerase, DyNAzyme-EXT Polymerase, Klenow fragment, DNA polymerase I, T7 polymerase, Sequenase™, Tfi polymerase, T4 DNA polymerase, Bst polymerase, Bca polymerase, BSU polymerase, phi-29 DNA polymerase and DNA polymerase Beta or modified versions thereof. In one embodiment, the DNA polymerase has a 3'-5' proofreading, i.e., exonuclease, activity. In one embodiment, the DNA polymerase has a 5'-3' proofreading, i.e., exonuclease, activity. In one embodiment, the DNA polymerase has strand displacement activity, i.e., the DNA polymerase causes the dissociation of a paired nucleic acid from its complementary strand in a direction from 5' towards 3', in conjunction with, and close to, the template-dependent nucleic acid synthesis. DNA polymerases such as *E. coli* DNA polymerase I, Klenow fragment of DNA polymerase I, T7 or T5 bacteriophage DNA polymerase, and HIV virus reverse transcriptase are enzymes which possess both the polymerase activity and the strand displacement activity. Agents such as helicases can be used in conjunction with inducing agents which do not possess strand displacement activity in order to produce the strand displacement effect, that is to say the displacement of a nucleic acid coupled to the synthesis of a nucleic acid of the same sequence. Likewise, proteins such as Rec A or Single Strand Binding Protein from *E. coli* or from another organism could be used to produce or to promote the strand displacement, in conjunction with other inducing agents (Kornberg A. & Baker T. A. (1992), Chapters 4-6. In *DNA replication* (2nd ed., pp. 113-225). New York: W. H. Freeman).

The term "primer-directed extension" refers to any method known in the art wherein primers are used to initiate replication of nucleic acid sequences in the linear or logarithmic amplification of nucleic acid molecules. Primer-directed extension may be accomplished by any of several schemes known in this art including, but not limited to, polymerase chain reaction (PCR), lipase chain reaction (LCR) and strand-displacement amplification (SDA). "Primer-directed extension" can be carried out by DNA polymerase enzymes as described hereinabove.

The term "random amplification techniques" includes without limitation, multiple displacement amplification (MDA), random PCR, random amplification of polymorphic DNA (RAPD) or multiple annealing and looping based amplification cycles (MALBAC).

The term "receptor ligand" refers to any substance that binds to another entity, such as a receptor, from a larger complex.

The term "reverse transcription" refers to the replication of RNA using a RNA-directed DNA polymerase (reverse transcriptase, RT) to produce complementary strain of DNA (cDNA). The reverse-transcription of RNAs may be carried out by techniques well known to the skilled artisan, using a reverse transcriptase enzyme and a mix of 4 deoxyribonucleotides triphosphate (dNTPs), namely deoxyadenosine triphosphate (dATP), deoxycytidine triphosphate (dCTP), deoxyguanosine triphosphate (dGTP) and (deoxy)thymidine triphosphate (dTTP). In some embodiments, the reverse-transcription of RNAs comprises a first step of first-strand cDNA synthesis. Methods for first-strand cDNA synthesis are well-known to the skilled artisan. First-strand cDNA synthesis reactions can use a combination of sequence-specific primers, oligo(dT) primers or random primers. Examples of reverse transcriptase enzymes include, but are not limited to, M-MLV reverse transcriptase, SuperScript II (Invitrogen), SuperScript III (Invitrogen), SuperScript IV (Invitrogen), Maxima (ThermoFisher Scientific), ProtoScript II (New England Biolabs), PrimeScript (ClonTech).

The terms "single-cell epigenome profiling" or "single-cell" or "single-cell epigenomics" refer to the analysis of the epigenome of a single-cell.

The terms "single-cell genotyping" or "single-cell genomics" refer to the analysis of the genome of a single-cell.

The term "single-cell haplotyping" refers to the resolution of haplotypes on a whole genome basis.

The terms "single-cell transcriptome profiling" or "single-cell transcriptomics" refer to the analysis of the transcriptome of a single-cell.

The term "spacer region" refers to a chemical group or an anchor moiety that is used to extend the length of an oligonucleotide. Examples of spacer include, but are not limited to, ethyleneglycol polymer, alkyl, oligonucleotides, peptides and peptidomimetics.

The term "specific amplification techniques" includes without limitation, methods requiring temperature cycling (such as polymerase chairs reaction (PCR), ligase chain reaction, transcription based amplification) and/or isothermal amplification systems (such as self-sustaining sequence replication, replicase system, helicase system, strand displacement amplification, rolling circle-based amplification and NASBA).

The term "support" refers to a matrix upon which biological units and/or barcode units may be immobilized. The support may be rigid, solid or semi-solid.

The terms "template" or "template sequence" refer to a nucleic acid sequence for which amplification is desired. A template can comprise DNA or RNA. In one embodiment, the template sequence is known. In one embodiment, the template sequence is not known.

The term "template switching" refers to the ability of a reverse transcriptase to switch from an initial nucleic acid sequence template to the 3' end of a new nucleic acid sequence template (called "template switch oligonucleotide") having little or no complementarity to the 3' end of the cDNA synthesized from the initial template.

The terms "template switch adaptor sequence" and "template switch oligonucleotide" refer to an oligonucleotide template to which a polymerase switches from an initial template (e.g., a template DNA or RNA) during a nucleic acid polymerization reaction. In this regard, the template DNA or RNA may be referred to as a "donor template" and the template switch oligonucleotide may be referred to as an "acceptor template".

When reverse transcription occurs using a Moloney Murine Leukemia Virus Reverse Transcriptase (M-MLV reverse transcriptase), terminal nucleotidyl transferase (TdT) activity of the enzyme results in non-template-directed addition of nucleotides to the 3' end of the nascent cDNA strand. An exogenously added "template switch oligonucleotide" anneals to the C-tract by a poly(G) primer site. The reverse transcriptase then switches templates from the mRNA to the template switch oligonucleotide, adding an "adaptor sequence" or "adaptor" to the first strand cDNA (i.e. "adaptering"). Preferably, the adaptor sequence shares homology with the PCR handle.

The term "transcriptome" refers to the entire RNA component of an individual cell. In some embodiments, the term "transcriptome" may refer specifically to the polyadenylated products of RNA polymerase II.

The term "unique molecular identifier sequence" refers to a nucleic acid sequence useful for discriminating between amplification product duplicates after PCR amplification and further sequencing of nucleic acid, sequences from the biological units.

The term "vitamin" refers to any of a group of organic substances essential in small quantities to normal metabolism in a subject. Examples of vitamins include, but are not limited to, α-carotene, β-carotene, γ-carotene, retinol, and tretinoin (vitamin A); thiamin (vitamin B1) and analogues such as acefurtiamine, allithiamine, benfotiamine, fursultiamine, octotiamine, prosultiamine, and sulbutiamine; riboflavin (vitamin B2); niacin and nicotinic acid (vitamin B3); adenine, carnitine and choline (vitamin B4); pantothenic acid, dexpanthenol, and pantethine (vitamin B5); pyridoxine, pyridoxal phosphate, pyridoxamine, and pyritinol (vitamin B6); biotin (vitamin B7); adenosine monophosphate (AMP) and inositol (vitamin B8); folic acid, dihydrofolic acid, folinic acid, and levomefolic acid (vitamin B9); 4-aminobenzoic acid (pABA) (vitamin B10); pteryl-hepta-glutamic acid (PHGA) (vitamin B11); adenosylcobalamin, cyanocobalamin, hydroxocobalamin, and methylcobalamin (vitamin B12); orotic acid (vitamin B13); pangamic acid (vitamin B15); dimethylglycine (DMG) (vitamin B16); amygdalin (vitamin B17); L-carnitine (vitamin B20); ascorbic acid, and dehydroascorbic acid (vitamin C); ergosterol, and ergocalciferol (vitamin D2); 7-dehydrocholesterol, previtamin D3, cholecalciferol, 25-hydroxycholecalciferol, calcitriol, and calcitroic acid (vitamin D3); dihydroergocalciferol (vitamin D4); alfacalcidol, dihydrotachysterol, calcipotriol tacalcitol, and paricalcitol (vitamin D5); α-tocopherol, β-tocopherol, γ-tocopherol, δ-tocopherol, α-tocotrienol, β-tocotrienol, γ-tocotrienol, δ-tocotrienol, and tocofersolan (vitamin E); phylloquinone (vitamin K1); menaquinones (vitamin K2); menadione (vitamin K3); menadiol (vitamin K4); and derivative thereof.

The terminology used herein is for the purpose of describing particular cases only and is not intended to be limiting. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising".

DETAILED DESCRIPTION

The present invention relates to methods for trapping and barcoding discrete biological units in a hydrogel.

In one embodiment, a plurality of biological units is bound on a support. In one embodiment, a plurality of barcode units is bound on a support.

In one embodiment, the method comprises contacting a plurality of biological units with a plurality of barcode units to form biological unit/barcode unit complexes. In one embodiment, the method further comprises contacting the biological unit/barcode unit complexes with a hydrogel solution. In one embodiment, the method further comprises polymerizing the hydrogel solution to embed the biological unit/barcode unit complex in a hydrogel matrix. In one embodiment, the method further comprises barcoding the biological unit's nucleic acid within each biological unit/barcode unit complex in the hydrogel matrix.

In one embodiment, the biological units and barcode units unbind after hydrogel polymerization, i.e., the biological unit/barcode unit complexes' binding chemistry is degraded. Techniques to break down complexes are well-known to the skilled artisan.

In one embodiment, biochemistry and molecular biology assays can be performed on biological units trapped in a hydrogel according to the present invention. In one embodiment, biochemistry and molecular biology assays can be performed on discrete biological units trapped in a hydrogel according to the present invention. In one embodiment, biochemistry and molecular biology assays can be performed on barcode units trapped in a hydrogel according to the present invention. In one embodiment, biochemistry and molecular biology assays can be performed on discrete barcode units trapped in a hydrogel according to the present invention. In one embodiment, the hydrogel can be depolymerized to allow for certain biochemistry and molecular biology assays in solution and/or in bulk.

Examples of biochemistry and molecular biology assays include, but are not limited to, cell lysis, PCR, reverse transcription, nucleic acid hydrolyzing, decapping (i.e., hydrolysis of a 5' cap structure), transcriptome profiling (or transcriptomics), genotyping (or genomics), epigenome profiling (or epigenomics), phasing, and haplotyping.

Several aspects of the methods according to the present invention are described herein with reference to example applications for illustration. It should be understood that numerous specific details, relationships, and methods are set forth to provide a full understanding of the features described herein. One having ordinary skill in the relevant art, however, will readily recognize that the features described herein can be practiced without one or more of the specific details or with other methods. The features described herein are not limited by the illustrated ordering of acts or events, as some acts can occur in different orders and/or concurrently with other acts or events. Furthermore, not all illustrated acts or events are required to implement a methodology in accordance with the features described herein.

Hydrogels can be classified into physical and chemical hydrogels based on their cross-linking mechanism.

In one embodiment, hydrogels are prepared from at least one natural polymer. In one embodiment, hydrogels are prepared from at least one synthetic polymer. In one embodiment, hydrogels are prepared from at least one natural/synthetic hybrid polymer. In one embodiment, hydrogels are prepared from at least one natural polymer and at least one synthetic polymer.

In one embodiment, the hydrogels used in the present invention are physical hydrogels.

Physical hydrogel crosslinks include, but are not limited to, entangled chains, hydrogen bonding, hydrophobic interaction and crystallite formation. Physical hydrogel can be synthesized by ionic interaction, crystallization, stereocomplex formation, hydrophobized polysaccharides, protein interaction and hydrogen bond.

In one embodiment, physical hydrogels are permanent. In one embodiment, physical hydrogels are reversible.

In one embodiment, the hydrogels used in the present invention are chemical hydrogels.

Chemical hydrogels crosslinks include, but are not limited to, covalent bounds.

Chemical hydrogels can be synthesized by chain growth polymerization, addition and condensation polymerization and gamma, and electron beam polymerization.

In one embodiment, chemical hydrogels are formed by polymerization of end-functionalized macromers.

In one embodiment, chemical hydrogels are permanent. In one embodiment, chemical hydrogels are reversible.

In one embodiment, hydrogels are polysaccharide hydrogels.

Polysaccharides include, but are not limited to alginate, agarose, K-carrageenan, t-carrageenan, chitosan, dextran, heparin, gellan, native gellan gum, rhamsan, deacetylated rhamsan, S-657, welan.

In one embodiment, polymerized polysaccharide by hydrogels are formed by covalent crosslinking, ionic crosslinking, chemical conjugation, esterification and/or polymerization.

In one embodiment, polysaccharide hydrogel is alginate and polymerized alginate is formed by ionic crosslinking in presence of a divalent cation, such as calcium.

In one embodiment, hydrogels are protein-based hydrogels.

Proteins include, but are not limited to, collagen, fibrin, gelatin, laminin.

In one embodiment, polymerized protein-based hydrogels are formed by thermal gelation. In one embodiment, protein-based hydrogels are crosslinked using a crosslinker.

Protein-based hydrogels' crosslinkers include, but are not limited to, carbodiimide, cyanamide, dialdehyde starch, diimide, diisocyanate, dimethyl adipimidate, epoxy compounds, ethylaldehyde, formaldehyde, glutaraldehyde, glyceraldehyde, hexamethylenediamine, terephthalaldehyde and mixture thereof.

In one embodiment, hydrogels are polysaccharide hydrogels combined with proteins as described here above.

In one embodiment, hydrogels are nonbiodegradable synthetic hydrogels.

Nonbiodegradable polymers include, but are not limited to, vinylated monomers and vinylated macromers, in particular, 2-hydroxyethyl methacrylate, 2-hydroxypropyl methacrylate, acrylamide, acrylic acid, N-isopropylacrylamide, poly N-isopropylacrylamide, methoxypolyethylene glycol monoacrylate.

In one embodiment, nonbiodegradable molecule polymerization requires at least one crosslinker. In one embodiment, nonbiodegradable synthetic hydrogels are formed by copolymerization of a nonbiodegradable molecules and a crosslinker.

Nonbiodegradable synthetic hydrogels' crosslinkers include, but are not limited to, N,N'-methylenebisacrylamide, ethylene glycol diacrylate, polyethylene glycol diacrylate.

In one embodiment, nonbiodegradable molecule polymerization further requires at least one initiator, such as, e.g., persulfate ions (ammonium persulfate, potassium persulfate and the like), ammonium cerium (IV) nitrate, tetramethylethylenediamine (TEMED).

In one embodiment, the hydrogel can be depolymerized. By "depolymerization" is meant a reaction during which the hydrogel returns in solution. As will clearly appear to the skilled person, this does not necessarily require extensile depolymerization and/or extensive breakage of crosslinks. The extent of depolymerization and/or breakage of crosslinks required to achieve gel-to-sol transition will depend on the nature of the hydrogel and can be readily determined by common methods. In one embodiment, depolymerization of the hydrogel is chemical. In one embodiment, depolymerization of the hydrogel is thermal. In one embodiment, depolymerization of the hydrogel is enzymatic.

In one embodiment, depolymerization of the hydrogel can be achieved by divalent cation removal. Examples of hydrogels which can be depolymerized by divalent cation removal include, but are not limited to, alginate.

In one embodiment, depolymerization of the hydrogel can be achieved by addition of reducing agent. Examples of reducing agents include, but are not limited to, phosphines (e.g., tris(2-carboxyethyl)phosphine (TCEP)) and dithiothreitol (DTT). Examples of hydrogels which can be depolymerized by addition of reducing agent include, but are not limited to, hydrogels copolymerize with a crosslinker such as nonbiodegradable synthetic hydrogels.

In one embodiment, depolymerization of the hydrogel can be achieved by thermal melting, i.e., melting upon increase of the temperature.

In one embodiment, the hydrogel used in the present invention is thermosensitive.

By "thermosensitive" is meant a hydrogel which, after being formed, depolymerizes if raised above the melting point of the at least one polymer, and reforms if cooled to room temperature or below its melting point.

In one embodiment, the hydrogel used in the present invention is thermoreversible.

By "thermoreversible" is meant a hydrogel which, after being formed, depolymerizes if raised above the melting point of the at least one polymer and does not reform, even when cooled to room temperature or below its melting point.

In one embodiment, the melting point, of the at least one polymer of the hydrogel is between about 20° C. and about 200° C., preferably between about 25° C. and about 100° C.

In one embodiment, the hydrogel has a pore size sufficiently small to trap a biological unit, a barcode unit and/or an analyte extracted or derived from a biological unit. In one embodiment the hydrogel has a pore size sufficiently large to allow diffusion of biochemistry and molecular biology reagents.

In one embodiment, the hydrogel has a pore size ranging between about 1 nm and 1 µm, preferably between about 10 nm and 500 nm, more preferably between 25 nm and 250 nm.

In one embodiment, the hydrogel matrix is accessible to biochemistry and molecular biology reagents. In one embodiment, the hydrogel matrix has at least one surface accessible to biochemistry and molecular biology reagents. In one embodiment, the at least one surface accessible to biochemistry and molecular biology reagents is naturally occurring. In one embodiment, the at least one surface accessible to biochemistry and molecular biology reagents is shaped before, during and/or after hydrogel polymerization.

In one embodiment, the composition, shape, form, and modifications of the barcode unit can be selected from a range of options depending on the application.

Exemplary materials that can be used as a barcode unit in the present invention include, but are not limited to, acrylics, carbon (e.g., graphite, carbon-fiber), cellulose (e.g., cellulose acetate), ceramics, controlled-pore glass, cross-linked polysaccharides (e.g., agarose, SEPHAROSE™ or alginate), gels, glass (e.g., modified or functionalized glass), gold (e.g., atomically smooth Au(111)), graphite, inorganic glasses, inorganic polymers, latex, metal oxides (e.g., $SiO_2$, $TiO_2$, stainless steel), metalloids, metals (e.g., atomically smooth Au(111)), mica, molybdenum sulfides, nanomaterials (e.g., highly oriented pyrolitic graphite (HOPG) nanosheets), nitrocellulose, NYLON™, optical fiber bundles, organic polymers, paper, plastic, polacryloylmorpholide, poly(4-methylbutene), polyethylene terephthalate), poly(vinyl butyrate), polybutylene, polydimethylsiloxane (PDMS), polyethylene, polyformaldehyde, polymethacrylate, polypropylene, polysaccharides, polystyrene, polyurethanes, polyvinylidene difluoride (PVDF), quartz, rayon, resins, rubbers, semiconductor material, silica, silicon (e.g., surface-oxidized silicon), sulfide, and TEFLON™.

In one embodiment, the barcode unit is composed of a single material. In another embodiment, the barcode unit is composed of a mixture of several different materials.

In one embodiment, the barcode units used in the present invention can be simple square grids, checkerboard grids, hexagonal arrays and the like. Suitable barcode units also include, but are not limited to, beads, slides, chips, particles, strands, gels, sheets, tubing, spheres, containers, capillaries, pads, slices, films, culture dishes, microtiter plates such as 768-well, 384-well, 96-well, 48-well, 24-well, 12-well, 8-well, 6-well, 4-well, 1-well and the like. In various embodiments, the barcode unit may be biological, non-biological organic, inorganic, or any combination thereof.

Accordingly, a single barcode unit in a plurality of barcode units may be a minimal, indivisible part of said plurality of barcode units. A single barcode unit in a plurality of barcode units may be, e.g., a single square on a grid, a single bead in a population of beads, a single well in a microliter plate, etc. Alternatively, a single barcode unit in a plurality of barcode units may be a minimal part of said plurality of barcode units, wherein a single binding event between a biological unit and a barcode unit occurs at the molecular level. Alternatively, a single barcode unit in a plurality of barcode units may be a part of said plurality of barcode units ranging from about 1 $\mu m^2$ to about 1 $mm^2$, preferably from about 1 $\mu m^2$ to about 100 $\mu m^2$, more preferably from about 1 $\mu m^2$ to about 50 $\mu m^2$. In one embodiment, this size range is chosen for manufacturability. In one embodiment, this size range is chosen to ensure the formation of biological unit/barcode unit complexes with a 1:1 ratio.

The surface of the barcode unit can be modified according to methods known to the skilled artisan, to promote trapping or immobilization of biological units thereon.

In one embodiment, the barcode unit comprises reactive groups on its surface, such as carboxyl, amino, hydroxyl, epoxy, and the like.

In one embodiment, the barcode unit can have functional modifications, such as functional groups attached to its surface.

In one embodiment, the barcode unit used in the present invention is barcoded.

In one embodiment, each single barcode unit in a plurality of barcode units comprises a unique barcode. In one embodiment, each single barcode unit in a plurality of barcode units comprises clonal copies of a unique barcode.

In one embodiment, the barcode unit comprises at least one means involved with binding at least one biological unit.

In a preferred embodiment, the barcode unit is a bead.

The implementation of methods according to the present invention may rely on the downstream identification of each discrete biological unit and/or of the reactional analytes bound to each barcode unit. Therefore, it may be desirable to add at least one identifier or barcode to the barcode unit, in order to convey information about the source or origin of the biological unit and/or of an analyte within a sample, such as for example, a nucleic acid sequence extracted or derived from a discrete biological unit.

In one embodiment, the barcode unit is barcoded. In one embodiment, each single barcode unit in a plurality of barcode units comprises a unique barcode. In one embodiment, each single barcode unit in a plurality of barcode units comprises clonal copies of a unique barcode.

Barcodes may be of a variety of different formats, including labels, tags, probes, and the like.

In one embodiment, the barcode unit is optically barcoded. In one embodiment, the barcode unit is non-optically barcoded. In one embodiment, the barcode unit is optically and non-optically barcoded.

Optical barcodes include, but are not limited to, chromophores, fluorophores, quantum dots, styrene monomers, and combination thereof, which cast be identified, e.g., by their spectrum such as Raman spectrum or electromagnetic spectrum: and/or by their intensity of color.

Non-optical barcodes include, but are not limited to, biomolecular sequences such as DNA, RNA and/or protein sequences, which can be identified, e.g., by sequencing.

In one embodiment, the number of unique barcodes used in the present invention ranges from about 2 to about $10^{12}$.

In one embodiment, the number of clonal copies of each unique barcode comprised in each single barcode unit in a plurality of barcode units ranges from about 2 to about $10^{12}$.

In one embodiment, the barcode unit according to the present invention comprises non-optical barcodes. In one embodiment, the barcode unit according to the present invention comprises nucleic acid barcodes. In one embodiment, the nucleic acid barcode is single stranded. In one embodiment, the nucleic acid barcode is double stranded. In one embodiment, the nucleic acid barcode is single and/or double stranded. In one embodiment, the barcode unit, according to the present invention comprises DNA barcodes. In one embodiment, the barcode unit according to the present invention comprises RNA barcodes. In one embodiment, the barcode unit according to the present invention comprises a mixture of DNA and RNA barcodes.

In one embodiment, the nucleic acid barcode according to the present invention comprises from 5 to 20 nucleotides, preferably from 8 to 16 nucleotides.

In one embodiment, the barcode unit comprises a plurality of unique nucleic acid sequences, i.e., clonal copies of a unique barcode.

In one embodiment, said unique nucleic acid sequences are degenerate sequences. In one embodiment, said unique nucleic acid sequences are based on combinatorial chemistry.

Techniques to covalently attach barcodes on a support, preferably on a barcode unit, are well known to the skilled artisan, and include without limitation, replication of bound primers in a combinatorial fashion, ligation of adaptors in a combinatorial fashion, and chemical addition of nucleotides in a combinatorial fashion.

In one embodiment, said unique nucleic acid sequences are amplified on the barcode unit such that each single barcode unit in a plurality of barcode units is coated with clonal copies of a starting nucleic acid sequence.

In one embodiment, the covalent attachment of nucleic acid barcodes to the barcode unit is carried oat directly during synthesis of the barcodes. In one embodiment, the covalent attachment of nucleic acid barcodes to the barcode unit is carried out after synthesis of the barcode.

Techniques to covalently attach nucleic acid barcodes onto a barcode unit are well known to the skilled artisan.

In one embodiment, barcoding of the biological unit's nucleic acid is achieved by primer template annealing of the barcode to the biological unit's nucleic acid. In one embodiment, barcoding of the biological unit's nucleic acid is achieved by primer-directed extension of the barcode to the biological unit's nucleic acid. In one embodiment, barcoding of the biological unit's nucleic acid is achieved by ligation of the barcode to the biological unit's nucleic acid.

The implementation of the methods according to the present invention may rely on the immobilization, replication, extension and/or amplification of nucleic acid sequences of or from the biological units. Therefore, it may be desirable to add at least one nucleic acid sequence primer to the barcode unit, preferably at least one nucleic acid sequence primer to each single barcode unit in a plurality of barcode units, in order to immobilize, replicate, extend and/or amplify genetic information of or from the biological units.

In one embodiment, the nucleic acid sequence primer is single-stranded. In one embodiment, the nucleic acid sequence primer is double-stranded. In one embodiment, the nucleic acid sequence primer is single-stranded and/or double-stranded.

In one embodiment, the nucleic acid sequence primer is a degenerate (i.e., random) nucleic acid sequence primer. In one embodiment, the nucleic acid sequence primer is specific to a nucleic acid sequence of interest.

In one embodiment, the nucleic acid sequence primer can prime at multiple locations of the nucleic acid sequences of or from the biological units. In one embodiment, the nucleic acid sequences of or from the biological units comprise multiple priming sites.

In one embodiment, the nucleic acid sequence primer comprises a poly-dT sequence. In one embodiment, the nucleic acid sequence primer comprises a poly-dU sequence. Accordingly, the nucleic acid sequence primer is specific to a poly-A sequence. Poly-A sequences may be found, e.g., on the 3' end of mRNAs, within the poly-A tail.

In one embodiment, the nucleic acid sequence printer comprises the sequence $(dT)_n VN$, wherein n ranges from 5 to 50, V represents any nucleotide but T/U (i.e., A, C or G), and N represents any nucleotide (i.e., A, T/U, C or G). In one embodiment, the nucleic acid sequence primer comprises the sequence $(dU)_n VN$, wherein n ranges from 5 to 50, V represents any nucleotide but T/U (i.e., A, C or G), and N represents any nucleotide (i.e., A, T/U, C or G). Accordingly, the nucleic acid sequence primer is specific to a $(A)_n BN$ sequence, wherein n ranges from 5 to 50, B represent any nucleotide but A (i.e., T/U, C or G), and N represents any nucleotide (i.e., A, T/U, C or G). $(A)_n BN$ sequences may be found, e.g., on the 3' end of mRNAs, overlapping between the poly-A tail and the 3' UTR or CDS.

In one embodiment, the- nucleic acid sequence primer comprises a poly-I sequence. Accordingly, the nucleic acid sequence primer is non-specific and can prime to any nucleic acid sequence of or from the biological units.

In one embodiment, the nucleic acid sequence primer comprises from 5 to 50 nucleotides, preferably from 5 to 30 nucleotides.

In one embodiment, the covalent attachment of nucleic acid sequence primers to the barcode unit is carried out directly during synthesis of the nucleic acid sequence printers. In one embodiment, the covalent attachment of nucleic acid sequence primers to the barcode unit is carried out after synthesis of the nucleic acid sequence primers.

In one embodiment, the barcode unit comprises at least one oligonucleotide.

Its one embodiment, the at least one oligonucleotide is a DNA oligonucleotide. In one embodiment, the at least one oligonucleotide is a RNA oligonucleotide. In one embodiment, the at least one oligonucleotide is a DNA/RNA hybrid oligonucleotide.

In one embodiment, the at least one oligonucleotide is single-stranded. In one embodiment, the at least one oligonucleotide is double-stranded. In one embodiment, the at least one oligonucleotide is single-stranded and/or double-stranded.

In one embodiment, the at least one oligonucleotide comprises at least one nucleic acid barcode and at least one nucleic acid sequence primer. In one embodiment, the at least one oligonucleotide comprises from 5' to 3' at least one nucleic acid barcode and at least one nucleic acid sequence primer. In one embodiment, the at least one oligonucleotide comprises from 5' to 3' at least one nucleic acid sequence primer and at least one nucleic acid barcode. In one embodiment, the nucleic acid barcodes are identical across all oligonucleotides on the surface of a given barcode unit. In one embodiment, the nucleic acid barcodes are different across oligonucleotides on the surface of one barcode unit with respect to another barcode unit. In one embodiment, the nucleic acid sequence primer is identical across all oligonucleotides on the surface of a given barcode unit. In one embodiment, the nucleic acid sequence primer is different across all oligonucleotides on the surface of a given barcode unit. In one embodiment, the nucleic acid sequence primer is identical across all oligonucleotides and barcode units. In one embodiment, the nucleic acid barcode comprises from 5 to 20 nucleotides, preferably from 8 to 16 nucleotides. In one embodiment, the nucleic acid sequence primer comprises from 5 to 50 nucleotides, preferably from 5 to 30 nucleotides.

In one embodiment, the at least one oligonucleotide further comprises a PCR handle sequence. In one embodiment, the PCR handle sequence is identical across all oligonucleotides and barcodes units. In one embodiment, the PCR handle sequence comprises from 10 to 30 nucleotides, preferably from 15 to 25 nucleotides.

In one embodiment, the at least one oligonucleotide further comprises a unique molecular identifier sequence. In one embodiment, the unique molecular identifier sequence is different across all oligonucleotides on the surface of a given barcode unit. In one embodiment, the unique molecular identifier sequence comprises from 10 to 30 nucleotides, preferably from 15 to 25 nucleotides.

In one embodiment, the at least one oligonucleotide further comprises a spacer region.

In one embodiment, the at least one oligonucleotide comprises, from 5' to 3' (i.e., from proximal to distal with regard to the surface of the barcode unit):
optionally, a spacer region;
optionally, a PCR handle sequence;
a nucleic acid barcode;
optionally, a unique molecular identifier sequence; and
a nucleic acid sequence primer.

In one embodiment, the at least one oligonucleotide comprises, from 3' to 5' (i.e., from distal to proximal with regard to the surface of the barcode unit);
optionally, a spacer region;
optionally, a PCR handle sequence;
a nucleic acid barcode;
optionally, a unique molecular identifier sequence; and
a nucleic acid sequence primer.

In one embodiment, the covalent attachment of nucleic acid oligonucleotides to the barcode unit is carried out directly during synthesis of the nucleic acid oligonucleotides.

In one embodiment, the covalent attachment of nucleic acid oligonucleotides to the barcode unit is carried out after synthesis of the nucleic acid oligonucleotides.

Techniques to covalently attach and/or to synthesize nucleic acid oligonucleotides onto a barcode unit such as glass or plastic tubes or beads, nitrocellulose or nylon filters, microtiter wells, agarose bead gels and magnetic particles are well known to the skilled artisan. These include, but are not limited to, UV irradiation, biotin-avidin/streptavidin and covalent chemical attachment (Macosko et al., 2015. *Cell.* 161:1202-1214; Fan et al., 2015. *Science.* 347(6222): 1258367; Beaucage, S. L. (1993). *In Protocols for oligonucleotides and analogs-Synthesis and properties*. Totowa, N.J.: Humana Press, 20:33-61; Conner et al., 1983. *Proc Natl Acad Sci. USA.* 80:278-282; Lockley et al., 1997. *Nucleic Acids Res.* 25:1313-1314; Joos et al., 1997. *Anal Biochem.* 247:96-101; Cohen et al., 1997. *Nucl Acid Res.* 25:911-912; Yang et al., 1998. *Chem Lett.* 3:257-258; Maskos et al., 1992. *Nucl Acid Res.* 20:1679-1684; Chrisey et al., 1996. *Nucl Acid Res.* 24:3131-3039; Chrisey et al., 1996. *Nucl Acid Res.* 24:3040-3047; Marble et al., 1995. *Biotechnol Prog.* 11:393-396; Liu et al., 1997. *Promega Notes Mag.* 64:21-25; Weiler et al., 1996. *Anal Biochem.* 243:218-227; Beattie et al., 1995. *Mol Biotechnol,* 4:213-225; Rasmussen et al., 1991. *Anal Biochem.* 198:138-142; Timofeev et al., 1996 *Nucl Acid Res.* 24:3142-3148; Yershov et al., 1997. *Anal Biochem.* 250:203-211; DeAngelis et al., 1995. *Nucl Acid Res.* 23:4742-4743; Haukanes et al., 1993. *Biotechnology,* 11:60-63).

The implementation of the methods according to the present invention may rely on the binding and/or the immobilization of a biological unit on the barcode unit. Therefore, it may be desirable to add at least one means for binding a biological unit to the barcode unit, in order to trap discrete biological units.

In one embodiment, the binding and/or the immobilization of a biological unit to the barcode unit is aspecific. In one embodiment, the binding and/or the immobilization of a biological unit the barcode unit is specific.

In one embodiment, the binding and/or the immobilization of a biological unit on the barcode unit requires the presence of at least one means for binding a barcode unit on the biological unit.

Means for binding a biological unit and/or means for binding a barcode unit comprise, but is not limited to, a protein or a fragment thereof, a peptide, an antibody or a fragment thereof, a nucleic acid (such as single-stranded or double-stranded DNA or RNA), a carbohydrate, a vitamin or a derivative thereof, a coenzyme or a derivative thereof, a receptor ligand or derivative thereof, a hydrophobic group.

In one embodiment, the means for binding a biological unit and/or the means for binding a barcode unit comprise at least a protein and/or at least a peptide. Examples of proteins or peptides include, but are not limited to, antibodies (e.g., IgA, IgD, IgE, IgG, and IgM) and fragments thereof, including, but not limited to, Fab fragments. F(ab')$_2$ fragments, scFv fragments, diabodies, triabodies, scFv-Fc fragments, minibodies; protein A, protein G, avidin, streptavidin, receptors and fragments thereof, and ligands and fragments thereof.

In one embodiment, the means for binding a biological unit and/or the means for binding a barcode unit comprise at least a nucleic acid. Examples of nucleic acids include, but are not limited to, DNA, RNA and artificial nucleic acids, such as nucleic acids comprising inosine, xanthosine, wybutosine, and/or analogs thereof.

In one embodiment, the means for binding a biological unit and/or the means for binding a barcode unit comprise at least a carbohydrate. Examples of carbohydrates include, but are not limited to, monosaccharides, disaccharides and polysaccharides.

In one embodiment, the means for binding a biological unit and/or the means for binding a barcode unit comprise at least a vitamin.

In one embodiment, the means for binding a biological unit and/or the means for binding a barcode unit comprise at least a coenzyme.

In one embodiment, the means for binding a biological unit and/or the means for binding a barcode unit comprise at least a receptor ligand.

In one embodiment, the means for binding a biological unit and/or the means for binding a barcode unit comprise at least a hydrophobic group. Examples of hydrophobic groups include, but are not limited to, alkyl groups having from about 2 to about 8 carbon atoms, such as an ethyl, propyl, butyl, pentyl, heptyl, or octyl and isomeric forms thereof: or aryl groups such as phenyl, benzyl or naphthyl.

Techniques for coating a barcode unit with a means for binding a biological unit are well-known to the skilled artisan.

In one embodiment, the coating may be an all-over coating, i.e., completely covering the barcode unit, or may be a partial coating, i.e., covering only parts of the barcode unit.

In one embodiment, coating of a barcode unit with a means for binding a biological unit requires functionalization of the barcode unit. Examples of functionalized barcode units include, but are not limited to, amino-functionalized barcode units, carboxyl-functionalized barcode units, hydroxyl-functionalized barcode units and epoxy-functionalized barcode units. Techniques to functionalized a barcode unit are well-known in the art and include, but are not limited to, organosilane crosslinking, such as methoxysilane, ethoxysilane and acetoxysilane derivatives.

Examples of techniques for coating a barcode unit with a means for binding a biological unit include, but are not limited to, adsorption and covalent attachment. Covalent attachment may be performed on functionalized barcode units, using coupling agents such as carbodiimide (EDC), N-hydroxysuccinimide (NHS), sulfo-NHS, dimethylaminopropyl (DEAP), glutaraldehyde, aldehyde, sodium cyanoborohydride (NaCNBH$_3$), succinimidyl 3-(2-pyridyldithio)propionate (SPDP), dithiothreitol (DTT). and/or cyanogen bromide (BrNC).

In one embodiment, the at least one means for binding a barcode unit is naturally present on and/or in the biological unit. In one embodiment, the at least one means for binding a barcode unit is not naturally present on and/or in the biological unit.

In one embodiment, the biological unit is incubated with at least one antibody prior to the binding and/or the immobilization on the barcode unit. In one embodiment, the at least one antibody is specific towards the biological unit. In one embodiment, the at least one antibody is functionalized. Examples of functionalization include, but are not limited to, a protein or a fragment thereof, a peptide, an antibody or a fragment thereof, a nucleic acid (such as single-stranded or double-stranded DNA or RNA), a carbohydrate, a vitamin or a derivative thereof, a coenzyme or a derivative thereof, a receptor ligand or derivative thereof, and a hydrophobic group. In one embodiment, the antibody is biotinylated, i.e., is functionalized with a biotin moiety.

The implementation of the methods according to the present invention may rely on the binding and/or the immobilization of a single biological unit on a single barcode unit. Therefore, it may be desirable to prevent more than one biological unit from binding to each barcode unit; or alternatively, to prevent more than one barcode unit from binding to each biological unit.

Depending on parameters such as the concentration and/or the size of both the biological units and the barcode units, more than one biological unit can bind to a single barcode unit, and vice versa. Consequently, the methods according to the present invention provides means for ensuring, selecting and/or purifying biological unit/barcode unit complexes with a 1:1 ratio. The methods according to the present invention also provides means for forming biological unit/barcode unit complexes with a 1:1 ratio.

In one embodiment, the methods of the present invention comprise a step of selection and/or purification of biological unit/barcode unit complexes with a 1:1 ratio. According to one embodiment, a plurality of biological units may be contacted with a plurality of barcode units to form biological unit/barcode unit complexes, which may be further selected and/or purified.

Techniques to select and/or purify complexes are well known to the skilled artisan, and include, but are not limited to, size exclusion chromatography techniques, density gradient techniques, and/or filtration techniques.

In one embodiment, the methods of the present invention comprise a means for forming biological unit/barcode unit complexes with a 1:1 ratio.

In one embodiment, the biological units are bound to a support. In one embodiment, the barcode units are bound to a support.

Binding a plurality of biological units to a support prior to contacting them with a plurality of barcode units creates hindrance and allows the support to act as an impediment, preventing multiple binding of barcode units to a single biological unit. It may thus be desirable to use larger barcode units with respect to the biological units. Additionally, a limiting concentration of barcode units with respect to the biological units may be used to ensure the binding of at most one barcode unit per biological unit.

Alternatively, binding a plurality of barcode units to a support prior to contacting them with a plurality of biological units creates hindrance and allows the support to act as an impediment, preventing multiple binding of biological units to a single barcode unit. It may thus be desirable to use smaller barcode units with respect to the biological units. Additionally, a limiting concentration of biological units with respect to the barcode units may be used to ensure the binding of at most one biological unit per barcode unit.

In one embodiment, the composition, shape, form, and modifications of the support can be selected from a range of options depending on the application.

Exemplary materials that can be used as a support in the present invention include, but are not limited to, acrylics, carbon (e.g., graphite, carbon-fiber), cellulose (e.g., cellulose acetate), ceramics, controlled-pore glass, cross-linked polysaccharides (e.g., agarose, SEPHAROSE™ or alginate), gels, glass (e.g., modified or functionalized glass), gold (e.g., atomically smooth Au(111)), graphite, inorganic glasses, inorganic polymers, latex, metal oxides (e.g., $SiO_2$, $TiO_2$, stainless steel), metalloids, metals (e.g., atomically smooth Au(111)), mica, molybdenum sulfides, nanomaterials (e.g., highly oriented pyrolitic graphite (HOPG) nanosheets), nitrocellulose, NYLON™, optical fiber bundles, organic polymers, paper, plastics, polacryloylmorpholide, poly(4-methylbutene), polyethylene terephthalate), poly(vinyl butyrate), polybutylene, polydimethylsiloxane (PDMS), polyethylene, polyformaldehyde, polymethacrylate, polypropylene, polysaccharides, polystyrene, polyurethanes, polyvinylidene difluoride (PVDF), quartz, rayon, resins, rubbers, semiconductor material, silica, silicon (i.e., surface-oxidized silicon), sulfide, and TEFLON™.

In one embodiment, the support is composed of a single material. In another embodiment, the support is composed of a mixture of several different materials.

In one embodiment, the support used in the present invention may be tubes, beads, slides, chips, particles, strands, gels, sheets, tubing, spheres, containers, capillaries, pads, slices, films, culture dishes, microliter plates such as 768-well, 384-well, 96-well 48-well, 24-well, 12-well, 8-well, 6-well, 4-well, 1-well, square grids, checkerboard grids, hexagonal arrays and the like. In various embodiments, the support may be biological non-biological, organic, inorganic, or any combination thereof.

The surface of the support can be modified according to methods known to the skilled artisan, to promote trapping or immobilization of biological units and/or barcode units thereon.

In one embodiment, the trapping or immobilization of a biological unit and/or of a barcode unit to the support is aspecific.

In one embodiment, biological units and/or barcode units are trapped or immobilized in a layer of hydrogel that coats the support.

In one embodiment, the trapping or immobilization of a biological unit and/or of a barcode unit to the support is specific.

In one embodiment, the support comprises reactive groups on its surface, such as carboxyl amino, hydroxyl, epoxy, and the like. In one embodiment, the support can have functional modifications, such as functional groups attached to its surface. In one embodiment, the support comprises at least one means involved with binding at least one biological unit and/or at least one barcode unit.

Means for binding a biological unit and/or a barcode unit comprise, but are not limited to, a protein or a fragment thereof, a peptide, an antibody or a fragment thereof, a nucleic acid (such as single-stranded or double-stranded DNA or RNA), a carbohydrate, a vitamin or a derivative thereof, a coenzyme of a derivative thereof, a receptor ligand or derivative thereof, and a hydrophobic group, as described hereinabove.

Techniques for coating a support with a means for binding a biological unit and/or a barcode unit are well-known to the skilled artisan.

In one embodiment, the coating may be an all-over coating, i.e., completely covering the support, or may be a partial coating, i.e., covering only parts of the support.

In one embodiment, coating of a support with a means for binding a biological unit and/or a barcode unit requires functionalization of the support. Examples of functionalized supports include, but are not limited to, amino-functionalized supports, carboxyl-functionalized supports, hydroxyl-functionalized supports, and epoxy-functionalized supports. Techniques to functionalize a support are well-known in the art and include, but are not limited to, organosilane cross-linking, such as methoxysilane, ethoxysilane and acetoxysilane derivatives.

Examples of techniques for coating a support with a means for binding a biological unit and/or a barcode unit include, but are not limited to, adsorption and covalent attachment. Covalent attachment may be performed on functionalized supports, using coupling agents such as carbodiimide (EDC), N-hydroxysuccinimide (NHS), sulfo-NHS, dimethylaminopropyl (DEAP), glutaraldehyde, aldehyde, sodium cyanoborohydride ($NaCNBH_3$), succinimidyl 3-(2-pyridyldithio)propionate (SPDP), dithiothreitol (DTT), and/or cyanogen bromide (BrNC).

In one embodiment, the method for trapping discrete biological units in a hydrogel, according to the present invention, comprises the steps of:
a) contacting a plurality of biological units with a plurality of barcode units to form biological unit/barcode unit complexes,
b) contacting said biological unit/barcode unit completes with a hydrogel solution,
c) polymerizing the hydrogel solution to embed said biological unit/barcode unit complexes in a hydrogel matrix, and
d) barcoding the biological unit's nucleic acid within each of said biological unit/barcode unit complexes in the hydrogel matrix.

In one embodiment, each barcode unit comprises at least a means involved with binding a biological unit as defined hereinabove. In one embodiment, each biological unit comprises at least a means involved in binding the barcode unit as defined hereinabove.

In one embodiment, each barcode unit comprises a unique barcode as defined hereinabove. In one embodiment each barcode unit comprises clonal copies of a unique barcode.

In one embodiment, each barcode unit comprises at least one nucleic acid sequence primer as defined hereinabove.

In one embodiment, each barcode unit comprises a nucleic acid oligonucleotide as defined hereinabove.

In one embodiment, the plurality of biological units is bound to a support as defined hereinabove. In one embodiment, the plurality of barcode units is bound to a support as defined hereinabove.

In one embodiment, the methods according to the present invention may comprise a step of select and/or sorting of the biological units. Selection and/or sorting of biological units may be based on the expression of a given surface molecule such as a protein or a carbohydrate, or on specific light scattering and fluorescence characteristics of each biological unit. Selection and/or sorting of biological units may also be bases on their size. Methods to select and/or sort biological units are well-known to the skilled artisan, and comprise, but are not limited to, fluorescent activated cell sorting (FACS), fluorescence in situ hybridization-flow cytometry (FISH-FC), IsoRaft array, DEPArray lab-on-a-chip technology, magnetic cell sorting, immunoprecipitation filtration and the like.

In one embodiment, the methods according to the present invention may comprise a step of lysis of the biological units.

In one embodiment, the methods according to the present invention may comprise a step of reverse transcription of the biological units' RNA content, preferably of the biological units' mRNA content.

In one embodiment, biochemistry and molecular biology assays can be carried out before, during or after the step of barcoding the biological unit's nucleic acid within each of said biological unit/barcode unit complexes in the hydrogel matrix.

In one embodiment, the methods according to the present invention may comprise a step of pre-amplification of the biological units' nucleic acids, such as DNA, RNA or cDNA. In one embodiment, the methods according to the present invention may comprise a step of pro-amplification of the biological units' nucleic acids, such as DNA, RNA or cDNA, before the step of barcoding the biological unit's nucleic acid within each of said biological unit/barcode unit complexes in the hydrogel matrix.

In one embodiment, the methods according to the present invention may comprise a step of purifying templates for biochemistry and molecular biology assays. Endogenous or exogenous proteins and complexes bound to nucleic acid templates or membranes encapsulating nucleic acid templates can be removed from the hydrogel after biological unit/barcode unit complex trapping. Techniques for nucleic acid purification are well known to the skilled artisan and include, without limitation, the use of proteinase K and/or detergents such as SDS, sarkosyl, NP-40, and the like.

In one embodiment, the methods according to the present invention may comprise a step of cleaning amplified nucleic acids. Prior to preparing a nucleic acid library for sequencing, it can be desirable to remove single-stranded primers and reaction products such as enzymes. Techniques for nucleic and clean-up are well known to the skilled artisan, and include without limitation, the use of single-strand-specific nucleases and/or the use of phosphatases to dephosphorylate phosphorylated ends of nucleic acids. Examples of single-strand-specific nucleases include, but are not limited to, exonuclease I, mung bean nuclease, nuclease Bh1, nuclease P1, nuclease S1, BAL 31 nuclease. Examples of phosphatases include, but are not limited to alkaline phosphatase such as shrimp alkaline phosphatase.

In one embodiment, the methods according to the present invention may comprise a step of sizing the amplified nucleic acids. Short-read sequences, such as Illumina or Ion Torrent, operate best when fed DNA libraries that contain fragments of similar sizes, according to the manufacturer's recommendations. When libraries are not properly size-selected, these sequencers can become less efficient. Techniques for DNA size selection are well known to the skilled artisan, including, but not limited to, nucleic acid gel electrophoresis, bead-based protocols, pulsed-field gel electrophoresis (PFGE), automated size selection.

In one embodiment, the methods according to the present invention may comprise a step of nucleic acids and/or cDNA library fragmentation.

In one embodiment, the methods according to the present invention may comprise a step of nucleic acids and/or cDNA library enzymatic fragmentation.

In one embodiment, the methods according to the present invention may comprise a step of nucleic acids and/or cDNA library mechanical fragmentation.

In one embodiment, the methods according to the present invention may comprise a step of nucleic acids and/or cDNA library polishing.

In one embodiment, the methods according to the present invention may comprise a step of nucleic acids and/or cDNA library A-tailing.

In one embodiment, the methods according to the present invention may comprise a step of nucleic acids and/or cDNA library ligation.

In one embodiment, the methods according to the present invention may comprise a step of tagmentation. Techniques for tagmenting nucleic acids and/or cDNA library are well known to the skilled artisan.

In one embodiment, the methods according to the present invention may comprise a step of nucleic acid sequencing. In one embodiment, the sequencing of nucleic acids may be carried out by next generation sequencing (NGS). Methods for NGS of nucleic acid libraries are known to the skilled artisan, and comprise, but are not limited to, paired-end sequencing, sequencing by synthesis, and single-read sequencing.

In one embodiment, the methods according to the present invention comprise contacting the hydrogel matrix with biochemistry and molecular biology reagents, useful to carry out the method. In one embodiment, the hydrogel matrix is porous enough to allow diffusion of biochemistry and molecular biology reagents, without allowing diffusion of the barcode unit, biological unit and/or analytes, such as for example, nucleic acids extracted or derived from a discrete biological unit. In one embodiment, subsequent steps can be performed by exchanging and/or washing biochemistry and molecular biology reagents in contact with the hydrogel matrix.

Biochemistry and molecular biology reagents are well-known to the skilled artisan, and encompass all reagents known to perform biochemistry and molecular biology assays, such as solutions (buffer solutions, wash solutions, and the like), detergents, enzymes, nucleic acid primers, and the like.

In one embodiment, diffusion of biochemistry and molecular biology reagents is a passive diffusion. Passive diffusion includes, but is not limited to, osmosis and diffusiophoresis.

In one embodiment, diffusion of biochemistry and molecular biology reagents is an active diffusion. Techniques for active diffusion in a hydrogel are well-known to the skilled artisan, and include, but are not limited to, the use of pumps, electroosmosis and electrophoresis.

In one embodiment, subsequent steps are performed by exchanging the majority reagent in contact with the hydrogel.

In one embodiment, the methods according to the present invention do not require the use of expensive oils, chips and/or droplet generation instruments.

In one embodiment, the methods according to the present invention can be automated In one embodiment, the methods according to the present invention may comprise a step of dissolving the hydrogel matrix. In one embodiment, dissolving of the hydrogel matrix can occur at any time throughout the method. Techniques to dissolve a hydrogel matrix are well-known to the skilled artisan, and comprise, but are not limited to, enzymatic depolymerization using enzymes such as agarase and thermal depolymerization using heat.

In one embodiment, dissolving of the hydrogel matrix can occur once at least one copy, preferably clonal copies of a unique barcode from at least one barcode unit have been incorporated into the biological unit and/or analytes, such as for example, nucleic acids extracted or derived front a discrete biological unit.

In one embodiment, depolymerization of the hydrogel matrix can occur once at least one nucleic acid extracted or derived from a discrete biological unit has primed to the at least one oligonucleotide, preferably to the at least one oligonucleotide comprising a nucleic acid sequence primer from a discrete barcode unit.

The methods described herein can be implemented in a variety of applications, including, but not limited to, single-cell transcriptome profiling, single-cell genotyping, phasing, and single-cell epigenome profiling.

It will become clear that the embodiments recited in the disclosed applications are not all compulsory features of the present invention, but are only mere illustrations of the implementation of the present invention. The one skilled in the art of single-cell transcriptome profiling, single-cell genotyping, phasing and/or single-cell epigenome profiling will know how to adapt the method using general knowledge of the field. Furthermore, the steps may be combined with and/or modified by any other suitable steps, aspects, and/or features of the present disclosure, including those described in scientific literature and patent documents listed in the present disclosure or known from the skilled artisan.

The present invention relates to a method for analyzing gene expression in discrete biological units.

Single-cell transcriptome profiling relies on the amplification of a single cell's mRNAs content and its sequencing. The generation of a single cell transcriptome generally requires a first step of reverse transcription to convert the mRNAs with poly(A) tails into first-strand cDNAs, which can be further amplified and sequenced.

In one embodiment, the method for analyzing gene expression in discrete biological units may comprise the steps of:
a) contacting a plurality of biological units with a plurality of barcode units to form biological unit/barcode unit complexes, wherein each barcode unit comprises a unique barcode, and wherein said barcode units comprise at least one means involved with binding said biological units,
b) contacting said biological unit/barcode unit complexes with a hydrogel solution,
c) polymerizing the hydrogel solution to embed said biological unit/barcode unit complexes in a hydrogel matrix,
d) releasing nucleic acids from each biological unit in the hydrogel matrix,
e) barcoding said nucleic acids from each biological unit in the hydrogel matrix.
f) synthetizing a cDNA library from the nucleic acids from each biological unit,
g) amplifying said cDNA library from each biological unit, wherein amplification of said cDNA library from each biological unit incorporates clonal copies of said unique barcode into the amplification products from each biological unit, and
h) sequencing the amplification products.

In one embodiment, the method for analyzing gene expression in discrete biological units according to the present invention comprises additional steps which are well-known to the skilled artisan. Such steps are described in Macosko et al., 2015. *Cell* 161:1202-1214; Fan et al., 2015. *Science.* 347(6222):1258567; Klein et al., 2015. *Cell.* 161 (5):1187-201; Gierahn et al., 2017. *Nat Methods.* 14(4):395-398; and U.S. patent applications US2016-0289669, US2016-0265069, US2016-0060621 and US2015-037660, the content of all of which is hereby incorporated by reference.

In one embodiment, each barcode unit comprises at least one oligonucleotide comprising a poly-dT nucleic acid sequence primer, a unique barcode and/or a PCR handle.

In one embodiment each barcode unit comprises at least one oligonucleotide comprising a poly-dU nucleic acid sequence primer, a unique barcode and/or a PCR handle.

In one embodiment, each barcode unit comprises at least one oligonucleotide comprising a (dT)nVN nucleic acid sequence primer, a unique barcode and/or a PCR handle, wherein n ranges from 5 to 50, V represents any nucleotide but T/U (i.e. A, C or G) and N represents any nucleotide (i.e., A, T/U, C or G).

In one embodiment, each barcode unit comprises at least one oligonucleotide comprising a (dU)nVN nucleic acid sequence primer, a unique barcode and/or a PCR handle, wherein n ranges from 5 to 50, V represents any nucleotide but T/U (i.e. A, C or G) and N represents any nucleotide (i.e., A, T/U, C or G).

In one embodiment, releasing nucleic acids from each biological unit is performed by cell lysis, preferably by cell lysis using a non-ionic detergent and/or proteinase K.

In one embodiment, the method further comprises a step of washing out the non-ionic detergent and/or proteinase k.

In one embodiment, the method further comprises a step of inactivating proteinase K. In one embodiment, inactivation of proteinase K is performed by heat and/or chemical inhibition.

In one embodiment, synthetizing a cDNA library from the nucleic acids from each biological unit is performed with at least one nucleic acid sequence primer of the at least one oligonucleotide of the barcode unit.

In one embodiment, synthesizing a cDNA library from the nucleic acids from each biological unit is performed by reverse transcription, i.e., using a reverse transcriptase.

In one embodiment, the reverse transcriptase is a M-MLV reverse transcriptase.

In one embodiment, a complementary strand of the cDNAs of the cDNA library is synthetized, preferably using second strand reaction components. In one embodiment, the complementary strand of the cDNAs of the cDNA library is synthetized using RNAse H, DNA polymerase I and/or DNA ligase.

In one embodiment, the cDNA library is fragmented, to obtain cDNA fragments. Methods for fragmenting DNA are well-known in the art, and include, but are not limited to, Covaris sonication and DNA enzymatic cutting.

In one embodiment, cDNA fragments are polished. In one embodiment, cDNA fragments are A-tailed.

In one embodiment, adaptors are added to the cDNA library. Adaptors may be added to the cDNA library using various methods, including but not limited to, Tn5 transposition and ligation.

In one embodiment, amplification of the cDNA library is performed with at least one nucleic acid sequence primer of the at least one oligonucleotide of the barcode unit.

In one embodiment, amplification steps can be enhanced using free nucleic acid sequence primers, i.e., nucleic acid sequence primer which are not bound to a barcode unit.

The present invention also relates to a method for analyzing the genotype in discrete biological units.

Single-cell genotyping relies on the whole genome amplification (WGA) of a single cell's DNA to generate enough DNA for sequencing. Several methods for WGA are available and well-known to the skilled artisan. Some methods however lead to amplification bias, and subsequent inadequate genome coverage. PCR-based exponential WGA with degenerate primers introduces sequence-dependent bias. Multiple displacement amplification (MDA), using the strand-displacing Φ29 DNA polymerase, represents an improvement, but may also introduce bias due to nonlinear amplification. Multiple annealing and loop-based amplification cycles (MALBAC) is another method which introduces quaslinear preamplification to reduce the bias associated with nonlinear amplification. It relies on the BstI DNA polymerase for the quasilinear preamplification phase, along with high-fidelity PCR enzymes for subsequent exponential amplification (Zong et al., 2012. *Science* 338(6114):1622-6; Lu et al., 2012. *Science*. 338(6114):1627-30).

In one embodiment, the method, for analyzing the genotype in discrete biological units may comprise the steps of:
a) contacting a plurality of biological units with a plurality of barcode units to form biological unit/barcode unit complexes, wherein each barcode unit comprises a unique barcode, and wherein said barcode units comprise at least one means involved with binding said biological units,
b) contacting said biological unit/barcode unit complexes with a hydrogel solution,
c) polymerizing the hydrogel solution to embed said biological unit/barcode unit complexes in a hydrogel matrix,
d) releasing genomic DNA from each biological unit in the hydrogel matrix,
e) barcoding said genomic DNA from each biological unit in the hydrogel matrix,
f) optionally, synthetizing a DNA library from the nucleic acids from each biological unit,
g) amplifying said genomic DNA or DNA library from each biological unit, wherein amplification of said genomic DNA or DNA library from each biological unit incorporates clonal copies of said unique barcode into the amplification products of each biological unit, and
h) sequencing the amplification products.

In one embodiment, the method for analyzing the genotype in discrete biological units according to the present invention comprises additional steps which are well-known to the skilled artisan. Such steps are described in Hutchison et al., 2005. *Proc Natl Acad Sci USA* 102(48):17332-6; Leung et al., 2016. *Proc Natl Acad Sci USA*. 113(30):8484-9; Wang et al., 2012. *cell*. 150(2):402-12; Marcy et al., 2007. *PLoS Genet.* 3(9):1702-8; Gole et al., 2013. *Nat Biotechnol.* 31(12):1126-32; Zhang et al., 2006. *Nat Biotechnol.* 24(6):680-6; and international applications WO2016/0615517 and WO2005/003304, the content of all of which is herein incorporated by reference.

In one embodiment, each barcode unit comprises at least one oligonucleotide comprising a nucleic acid sequence primer, a unique barcode and/or a PCR handle. In one embodiment, each barcode unit comprises at least one oligonucleotide comprising an oligo-dN primer (such as an hexanucleotide d($N_6$) or an octanucleotide d($N_8$) primer, wherein N represents any nucleotide (i.e., A, T/U, C or G)), a unique barcode and/or a PCR handle.

In one embodiment, releasing genomic DNA from each biological unit is performed by cell and/or nucleus lysis, preferably by cell and/or nucleus lysis using an ionic detergent and/or proteinase K.

In one embodiment, the method further comprises a step of washing out the ionic detergent and/or proteinase K.

In one embodiment, the method further comprises a step of inactivating proteinase K. In one embodiment, inactivation of proteinase K is performed by heat and/or chemical inhibition.

In one embodiment, the method further comprises a step of denaturation of the genomic DNA. Methods to denature genomic DNA are well-known to the skilled artisan and include, but are not limited to, alkaline treatment and/or heat.

In one embodiment, synthetizing a cDNA library from the nucleic acids from each biological unit is performed with at least one nucleic acid sequence primer of the at least one oligonucleotide of the barcode unit.

In one embodiment, synthetizing a cDNA library from the nucleic acids from each biological unit is performed by primer-directed extension.

In one embodiment, amplification of genomic DNA is performed by whole genome amplification (WGA). In one embodiment, amplification of genomic DNA is performed with at least one nucleic acid sequence primer of the at least one oligonucleotide of the barcode unit.

In one embodiment, amplified genomic DNA is fragmented, to obtain DNA fragments. Methods for fragmenting DNA are well-known in the art, and include, but are not limited to, Covaris sonication and DNA enzymatic cutting.

In one embodiment, cDNA fragments are polished. In one embodiment, cDNA fragments are A-tailed.

In one embodiment, adaptors are added to the DNA fragments. Adaptors may be added to the DNA fragments using various methods, including but not limited to, Tn5 transposition and/or ligation.

In one embodiment, the method for analyzing the genotype in discrete biological units may implement direct library preparation (DLP). In one embodiment, amplified genomic DNA is tagmented. In one embodiment, unamplified genomic DNA is tagmented. Direct library preparation and tagmentation are well-known to the skilled artisan. Reference can be made, e.g., to Vitak et al., 2017. *Nat Methods.* 14(3):302-308; Adey et al., 2010. *Genome Biol.* 11(12):R119; Gertz et al., 2012. *Genome Res.* 22(1):134-41; and Zahn et al., 2017. *Nat Methods.* 14(2):167-173, the content of all of which is hereby incorporated by reference. Thus, in one embodiment each barcode unit comprises at least one oligonucleotide comprising a nucleic acid sequence primer, a unique barcode and/or a PCR handle. In one embodiment, the nucleic acid sequence primer has a sequence which is complementary to at least one Tn5 adaptor. In one embodiment, the nucleic acid sequence primer comprises or consist of sequence 5'-TCGTCGGCAGCGTC-3' (SEQ ID NO: 1) or 5'-GTCTCGTGGGCTCG-3' (SEQ ID NO: 2).

In one embodiment, the method comprises a step of ligating the tagmented genomic DNA from each biological unit to the at least one oligonucleotide of each barcode unit.

In one embodiment, the method comprises a step of amplification of the DNA fragments. Techniques to amplify DNA fragments are well-known to the skilled artisan.

In one embodiment, amplification of the DNA fragments is performed with at least one nucleic acid sequence primer of the at least one oligonucleotide of the barcode unit. In one embodiment, amplification of the DNA fragments is performed with at least one nucleic acid sequence primer which is not the at least one nucleic acid sequence primer of the at least one oligonucleotide of the barcode unit.

In one embodiment, amplification steps can be enhanced using free nucleic acid sequence primers, i.e., nucleic acid sequence primer which are not bound to a barcode unit.

The present invention also relates to a method for analyzing the haplotype of discrete biological units, i.e., for phasing.

Phasing relies on the whole genome amplification (WGA) of a high molecular weight, i.e., greater than 25 or 50 kilobases, DNA to generate enough DNA for sequencing. Several methods for WGA are available and well-known to the skilled artisan. Some methods however lead to amplification bias, and subsequent inadequate genome coverage. PCR-based exponential WGA with degenerate primers introduces sequence-dependent bias. Multiple displacement amplification (MDA), using the strand-displacing Φ29 DNA polymerase, represents an improvement, but may also introduce bias due to nonlinear amplification. Multiple annealing and loop-based amplification cycles (MALBAC) is another method which introduces quasilinear preamplification to reduce the bias associate with nonlinear amplification. It relies on the BstI DNA polymerase for the quasilinear preamplification phase, along with high-fidelity PCR enzymes for subsequent exponential amplification (Zong et al., 2012. *Science* 338(6114):1622-6; Lu et al., 2012. *Science*. 338(6114):1627-30). Alternatively, the Tn5 transposase and subsequent amplification can be used for library prep in a method termed "Contiguity-Preserving Transposition" (CPT-seq) (Amini et al., 2014. *Nat Genet.* 46(12):1343-9). In this method, the first step after the genomic DNA has been optionally purified is to tagment the DNA through Tn5 transposition. This fragments the DNA and adds universal adaptors directly to the template. After gap filling, PCR then occurs using primers complementary to the inserted Tn5 adaptors followed by sequencing.

In one embodiment, the method for analyzing the haplotype of discrete biological units may comprise the steps of:
a) contacting a plurality of biological units with a plurality of barcode units to form biological unit/barcode unit complexes, wherein each has code unit comprises a unique barcode, and wherein said barcode units comprise at least one means involved with binding said biological units,
b) contacting said biological unit/barcode unit complexes with a hydrogel solution,
c) polymerizing the hydrogel solution to embed said biological unit/barcode unit complexes in a hydrogel matrix,
d) optionally, releasing nucleic acids from each biological unit in the hydrogel matrix,
e) barcoding said nucleic acids from each biological unit in the hydrogel matrix,
f) optionally, synthetizing a DNA library from the nucleic acids from each biological unit,
g) amplifying said nucleic acid or DNA library from each biological unit, wherein amplification of said nucleic acids or DNA library from each biological unit incorporates clonal copies of said unique barcode into the amplification products from each biological unit, and
h) sequencing the amplification products.

In one embodiment, the method for analyzing the haplotype in discrete biological units according to the present invention comprises additional steps which are well-known to the skilled artisan. Such steps are described in International applications WO2015/126766, WO2016/130704, WO2016/61517, WO2015/95226, WO2016/003814, WO2005/003304, WO2005/200869, WO2014/124338, WO2014/093676: U.S. patent application US2015-066385: Kuleshov et al., 2014. *Nat Biotechnol.* 32(3):261-6; Amini et al., 2014. *Nat Genet.* 46(12):1343-9; Kaper et al., 2013. *Proc Natl Acad Sci USA*. 110(14):5552-7; Peters et al., 2012. *Nature*. 487(7406):190-5 and Zheng et al., 2016. *Nat Biotechnol.* 34(3):303-11, the content of all of which is hereby incorporated by reference.

In one embodiment, the at least one means for binding a biological unit is an anti-Tn5 antibody. In one embodiment, the at least one means for binding a biological unit is streptavidin and the biological unit is contacted with a biotinylated anti-Tn5 antibody.

In one embodiment, each barcode unit comprises at least one oligonucleotide computing a nucleic acid sequence primer, a unique barcode and/or a PCR handle. In one embodiment, the nucleic acid sequence primer has a sequence which is complementary to at least one Tn5 adaptor. In one embodiment, the nucleic acid sequence primer comprises or consist of sequence 5'-TCGTCGGCAGCGTC-3' (SEQ ID NO: 1) or 5'-GTCTCGTGGGCTCG-3' (SEQ ID NO: 2). In another embodiment, each barcode unit comprises at least one oligonucleotide comprising an oligo-dN primer (such as an hexanucleotide d($N_6$) or an octanucleotide d($N_8$) primer, wherein N represents any nucleotide (i.e., A, T/U, C or G)), a unique barcode and/or a PCR handle.

In one embodiment, releasing nucleic acids from each biological unit is performed by cell and/or nucleus lysis, preferably by cell and/or nucleus lysis using an ionic detergent and/or proteinase K.

In one embodiment, synthetizing a DNA library from the nucleic acids from each biological unit is performed with at least one nucleic acid sequence primer of the at least one oligonucleotide of the barcode unit.

In one embodiment, the method further comprises a step of washing out the ionic detergent and/or proteinase K.

In one embodiment, the method further comprises a step of inactivating proteinase K. In one embodiment, inactivation of proteinase K is performed by heat and/or chemical inhibition.

In one embodiment, the method further comprises a step of denaturation of the nucleic acids from each biological unit. Methods to denature nucleic acids are well-known to the skilled artisan and include, but are not limited to, alkaline treatment and/or heat.

In one embodiment, amplification of the nucleic acids from each biological unit is performed by whole genome amplification (WGA). In one embodiment, amplification of the nucleic acids from each biological unit is performed with at least one nucleic acid sequence primer of the at least one oligonucleotide of the barcode unit.

In one embodiment, amplified nucleic acids from each biological unit are fragmented, to obtain nucleic acid fragments. Methods for fragmenting DNA are well-know in the art, and include, but are not limited to, Covaris sonication and DNA enzymatic cutting.

In one embodiment, nucleic acid fragments are polished. In one embodiment, nucleic acid fragment's are A-tailed.

In one embodiment, adaptors are added to the nucleic acid fragments, preferably Tn5 adaptors. Adaptors may be added to the nucleic acid fragments using various methods, including but not limited to, Tn5 transposition and ligation.

In one embodiment, the method for analyzing the haplotype in discrete biological units may implement contiguity-preserving transposition (CTP-seq). Such method is described in international application WO2016/0615517, which is hereby incorporated by reference.

In one embodiment, the method comprises a step of tagmenting nucleic acids front each biological unit, preferably with Tn5 transposase. In one embodiment nucleic acids from each biological unit, are high molecular weight DNA (HMW-DNA). In one embodiment, tagmenting HMW-DNA from each biological, unit preserves the contiguity of the HMW-DNA from each biological.

In one embodiment, the method comprises a step of disrupting contiguity of the nucleic acids from each biological unit, preferably of the HMW-DNA from each biological unit. Techniques to disrupt contiguity are well-known to the skilled artisan and include, but are not limited to, release of Tn5 completes from the nucleic acids from each biological unit, preferably by using an ionic detergent and/or proteinase K.

In one embodiment, the method comprises a step of gap filling of the adaptor, preferably of the Tn5 adaptor.

In one embodiment, the method comprises a step of amplification of the tagmented nucleic acids from each biological unit. In one embodiment, amplification of the tagmented nucleic acids from each biological unit is performed with at least one nucleic acid sequence primer of be at least one oligonucleotide of the barcode unit.

In one embodiment, the method comprises a step of ligating the tagmented nucleic acids from each biological unit to the at least one oligonucleotide of each barcode unit.

In one embodiment, the method comprises a step of amplification of the tagmented nucleic acids. Techniques to amplify of nucleic acids are well-known to the skilled artisan. In one embodiment, amplification of the tagmented nucleic acids is performed with at least one nucleic acid sequence primer of the at least one oligonucleotide of the barcode unit.

In one embodiment, amplification steps can be enhanced using free nucleic acid sequence primers, i.e., nucleic acid sequence primer which are not bound to a barcode unit.

The present invention also relates, to a method for analyzing the epigenome in discrete biological units.

Single cell nucleosome positioning based on Tn5 transposition has been developed, termed "Assay for Transposase-Accessible Chromatin with high throughput sequencing" (ATAC-seq) (Buenrostro et al., 2015. *Nature* 523 (7561):485-90). In this method, the first step enable molecular access to nucleosome-free DNA by using low percentage non-ionic detergents on intact cells or isolated nuclei. The accessible DNA is then tagmented through Tn5 transposition. This fragments the DNA and adds universal adaptors directly to the template PCR then occurs using primers complementary to those adaptors followed in sequencing.

Thus, in one embodiment, the method for analyzing the epigenome in discrete biological units may comprise the steps of:

a) contacting a plurality of cellular biological units with a plurality of barcode units to form biological unit/barcode unit complexes, wherein each barcode unit comprises a unique barcode, and wherein said barcode units comprise at least one means involved with binding said biological units, b) contacting said biological unit/barcode unit complexes with a hydrogel solution, c) polymerizing the hydrogel solution to embed said biological unit/barcode unit complexes in a hydrogel matrix, d) releasing non-nucleosome-bound-DNA from each biological unit in the hydrogel matrix, e) barcoding said non-nucleosome-bound-DNA from each biological unit in the hydrogel matrix, f) optionally, synthesizing a DNA library from the non-nucleosome bound DNA from each biological unit, g) amplifying said non-nucleosome-bound-DNA of DNA library from each biological unit, wherein amplification of said non-nucleosome-bound-DNA or DNA library from each biological unit incorporates clonal copies said unique barcode into the amplification products from each biological unit h) sequencing the amplification products.

In one embodiment, amplification of non-nucleosome-bound-DNA or DNA library from each biological unit starts from non-nucleosome start sites. Non-nucleosome start sites are sites where transposition occurs, i.e., where the DNA is accessible. Optionally, non-nucleosome start sites are sites where DNA is enzymatically fragmented and where DNA is ligated.

Its one embodiment, the method for analyzing the epigenome in discrete biological units according to the present invention comprises additional steps which are well-known to the skilled artisan. Such steps are described in International application WO2014/189957; Buenrostro et al., 2015. *Nature.* 523(7561):486-90; Buenrostro al., 2013. *Nat Methods.* 10(12):1213-8; and Christiansen et al., 2017, *Methods Mol Biol.* 1551:207-221, the content of all of which is hereby incorporated by reference.

In one embodiment, each barcode unit comprises at least one oligonucleotide comprising a nucleic acid sequence primer, a unique barcode and/or a PCR handle. In one embodiment, the nucleic acid sequence primer has a sequence which is complementary to at least one adaptor sequence, preferably at least one Illumina adaptor sequence. In one embodiment, the nucleic acid sequence primer has a sequence which is complementary to at least one Tn5 adaptor. In one embodiment, the nucleic acid sequence primer comprises or consist of sequence 5'-TCGTCGGCAGCGTC-3' (SEQ ID NO: 1) or 5'-GTCTCGTGGGCTCG-3' (SEQ ID NO: 2).

In one embodiment, releasing non-nucleosome bound DNA from each biological unit is performed by cell lysis, preferably by cell lysis using a non-ionic detergent and/or proteinase K.

In one embodiment, synthetizing a DNA library from the non-nucleosome bound DNA from each biological unit is performed with at least one nucleic acid sequence primer of the at least one oligonucleotide of the barcode unit.

In one embodiment, the method further comprises a step of washing out the non-ionic detergent and/or proteinase K.

In one embodiment, the method further comprises a step of inactivating proteinase K. In one embodiment, inactivation of proteinase K is performed by heat and/or chemical inhibition.

In one embodiment, non-nucleosome bound DNA is tagmented. Techniques for tagmentation are well-known to the skilled artisan. In one embodiment, tagmentation of non-nucleosome bound DNA is performed by Tn5 transposition, preferably using Illumina adaptor sequences.

In one embodiment, the method comprises a step of ligating the tagmented non-nucleosome bound DNA from each biological unit to the at least one oligonucleotide of each barcode unit.

In one embodiment, the method comprises a step of amplification of the tagmented non-nucleosome bound DNA front each biological unit. Techniques to amplify DNA are well-known to the skilled artisan.

In one embodiment, amplification of the tagmented non-nucleosome bound DNA is performed with at least one nucleic acid sequence primer of the at least one oligonucleotide of the barcode unit. In one embodiment, amplification of the tagmented non-nucleosome bound DNA is performed with at least one nucleic acid sequence primer which is not the at least one nucleic acid sequence primer of the at least one oligonucleotide of the barcode unit.

In one embodiment, amplification of the tagmented non-nucleosome bound DNA incorporates the adaptor sequence from the Tn5 transposases into the amplification products from each biological unit.

In one embodiment, amplification steps can be enhanced using free nucleic acid sequence primers, i.e., nucleic acid sequence primer which are not bound to a barcode unit.

The present invention also relates to a kit. In one embodiment, the kit comprises:
- a plurality of barcode units,
- a hydrogel solution and/or hydrogel monomers for preparing a hydrogel solution,
- reagents and solutions for biochemistry and molecular biology assays, and
- instructions for use.

In one embodiment, each barcode unit comprises at least a means involved with binding biological units as defined hereinabove. In one embodiment, each barcode unit comprises at least one nucleic acid sequence primer as defined hereinabove. In one embodiment, each barcode unit comprises at least one nucleic acid oligonucleotide as defined hereinabove.

In one embodiment, the kit further comprises at least one support for binding biological units and/or barcode units.

In one embodiment, the kit comprises:
- a support comprising a plurality of pre-bound barcode units,
- a hydrogel solution and/or hydrogel monomers for preparing a hydrogel solution,
- reagents and solutions for biochemistry and molecular biology assays, and instructions for use.

In one embodiment, each barcode unit comprises at least a means involved with binding biological units as defined hereinabove. In one embodiment, each barcode unit comprises at least one nucleic acid sequence primer as defined hereinabove. In one embodiment, each barcode unit comprises at least one nucleic acid oligonucleotide as defined hereinabove.

EXAMPLES

The present invention is illustrated by the following examples. However, it should be understood that the invention is not limited to the specific details of these examples.

Example 1

Trapping and Barcoding Discrete Biological Units in a Hydrogel

The present invention relates to the trapping of discrete biological units (i.e., cells or groups of cells, viruses, organelles, macromolecular complexes or biological macromolecules).

Figure 1:
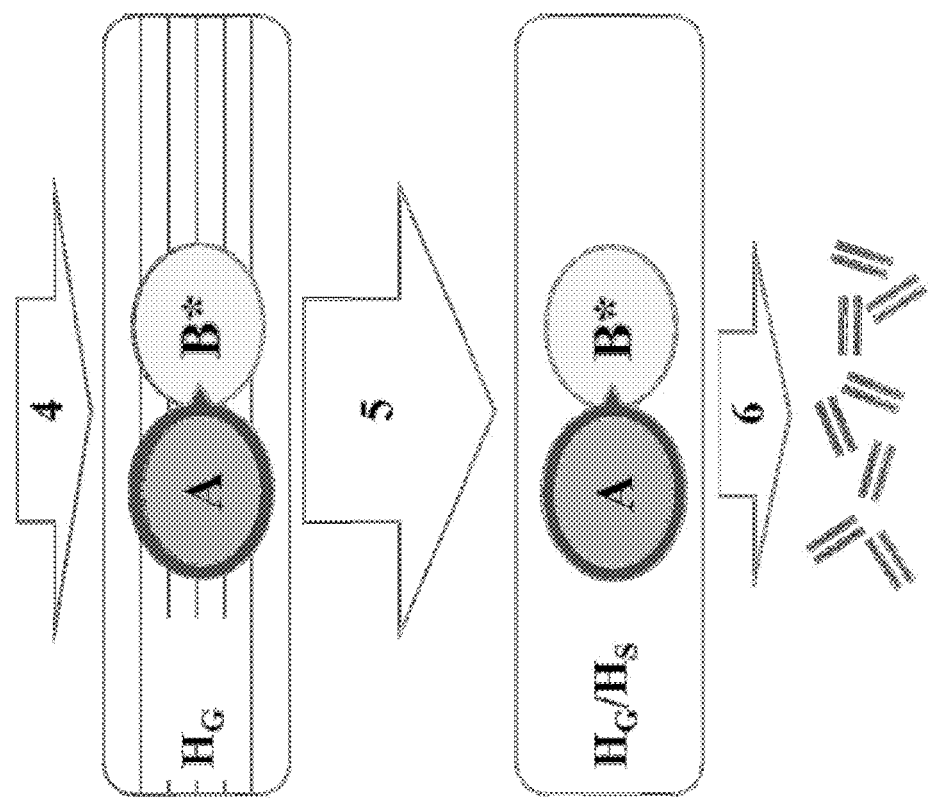
FIG. 1 is a diagram illustrating the trapping and barcoding of biological units in hydrogel. The following symbols are used: (A) Barcode unit; (B) Biological unit; (B*) Barcoded biological unit; (C) Means for binding biological units; ($H_S$) Hydrogel (sol state); ($H_G$) Hydrogel matrix (hydrogel in gel state); ($H_G/H_S$) Hydrogel in solid or gel state; (1) Binding of biological units and barcode units; (2) Contacting with hydrogel solution; (3) Polymerization of hydrogel; (4) Barcoding of biological units; (5) Primer-directed extension, Ligation, Amplification, Fragmentation, Adaptering; (6) Next generation sequencing.
Figure 1:
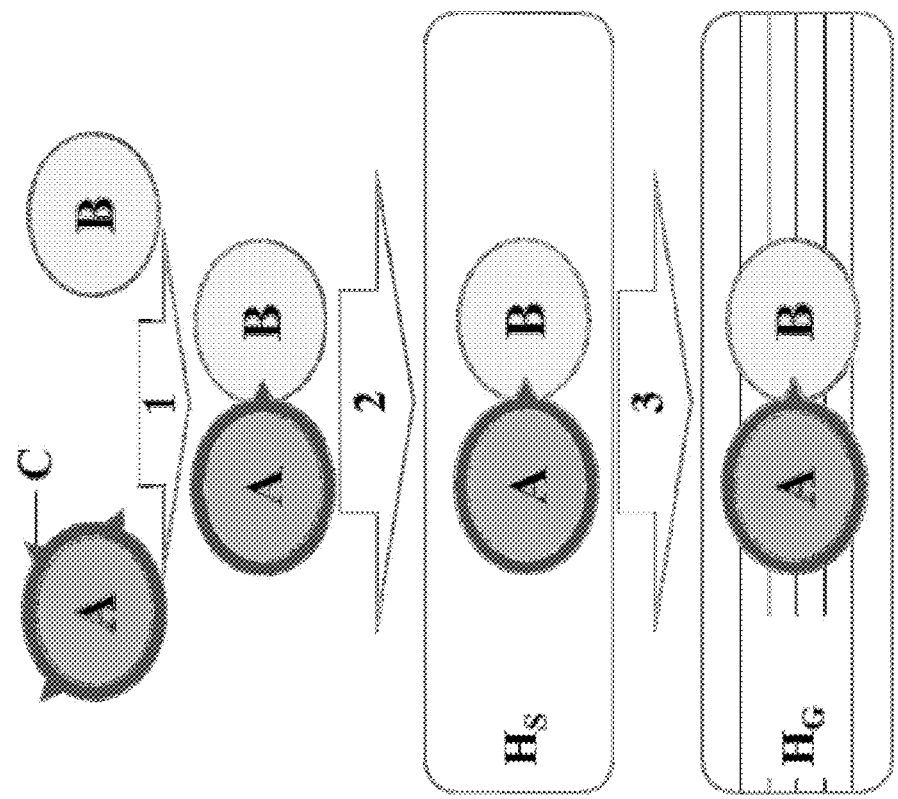

The present invention and its applications rests upon the implementation of successive steps described in FIG. 1.

In a first step, biological unit/barcode unit complexes are formed, each complex comprising a single barcode unit and a single biological unit (step 1 of FIG. 1), Biological unit/barcode unit complexes can be formed upon binding and/or immobilization of the biological unit on the barcode unit. Barcode units must thus carry on their surface a means for binding, either specifically or non-specifically, biological units. These means include proteins or fragments thereof, peptides, antibodies or fragments thereof, nucleic acids, carbohydrates, vitamins or derivatives thereof, coenzymes or derivative thereof, receptor ligands derivative thereof and/or hydrophobic groups. Concurrently, the biological units must carry, either naturally or not, a complementary means, binding to the means of the barcode unit. For example, a means for binding a biological unit can be an antibody, directed to molecules expressed or present (either naturally or artificially) at the surface of the biological unit. Another option can be the use of a biotinylated antibody directed to molecules expressed or present at the surface of the biological unit, and the subsequent binding of the biological unit carrying the biotinylated antibody to barcode units coated with streptavidin.

Once the biological unit/barcode unit complexes are formed, they can be contacted with a hydrogel solution, which upon polymerization, traps the biological unit/barcode unit complexes (steps 2-3 of FIG. 1).

Biochemistry and molecular biology assays can then be performed directly in the hydrogel matrix, by contacting the hydrogel with any required reagent and/or solution.

For example, a suitable hydrogel solution can be alginate. Its fine grain size allows for the formation of very small pores upon polymerization with calcium, trapping the biological unit/barcode unit complexes without any risk of diffusion, while still allowing for the diffusion of smaller components like reagent and/or solution.

Typically, when the biological unit is a cell, a group of cell, a nucleus or an organelle, a first step will comprise the lysis of the biological unit, to release its nucleic acid content. Any detergent level is supported by the hydrogel platform, allowing to lyse even difficult-to-lyse biological units.

The released nucleic acids can then be barcoded (step 4 of FIG. 1), through priming to the oligonucleotide coated on the surface of the barcode unit. Typically, each barcode unit comprises clonal copies of an oligonucleotide, which is composed of at least one priming site (nucleic acid sequence primer) and a barcode sequence. The barcode sequence should always be identical in every oligonucleotide of a given barcode unit, so as to allow identification of the source or origin of the nucleic acids extracted or derived from one discrete biological unit.

Once barcoding is achieved (i.e., priming of the biological unit's nucleic acids to the barcode unit's nucleic acid sequence primer), classical biochemistry and molecular biology assays can be carried out on the barcoded nucleic acids, either while still entrapped in the hydrogel matrix, or in solution, after hydrogel matrix has been dissolved. These include without limitation and not necessarily in this order, primer-directed extension, ligation, amplification, fragmentation, addition of adaptor sequences, next generation sequencing and the like (steps 5-6 of FIG. 1). For example, when using alginate as a hydrogel, calcium can be washed out from the hydrogel to allow depolymerization. Stabilization of the primed, i.e., barcoded nucleic acids, prior to any biochemistry and molecular biology assay, and in particular, prior to primer-directed extension, can be achieved using other cations, such as sodium.

Figure 2:
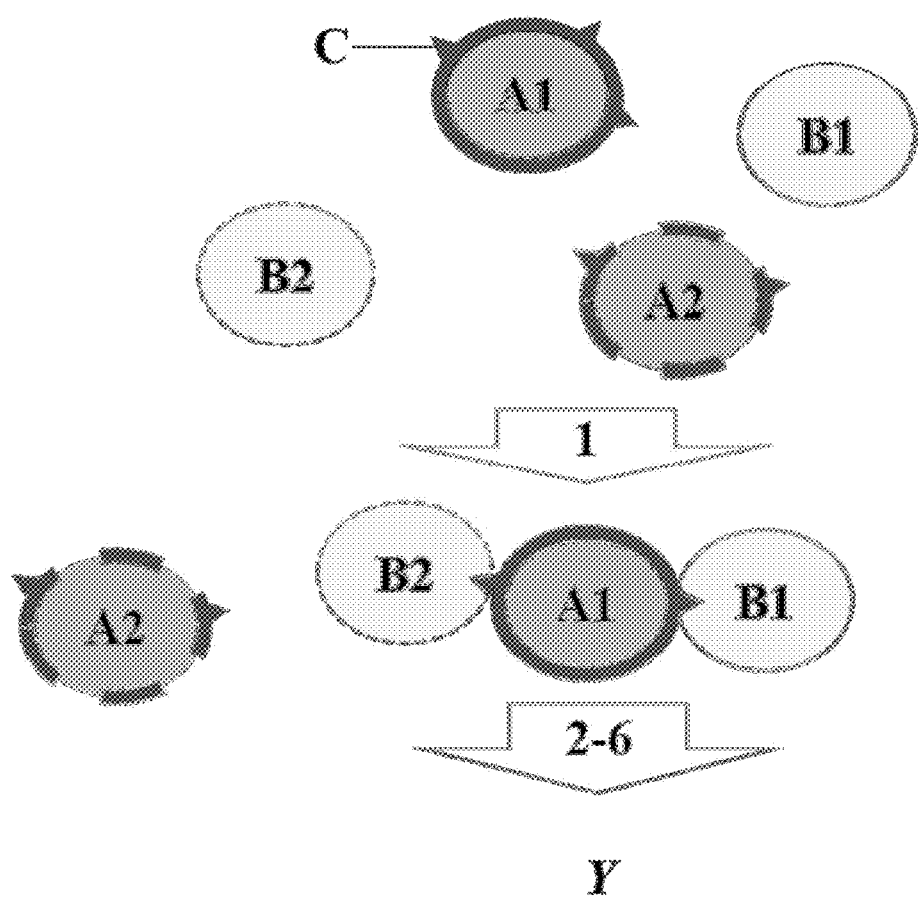
FIG. 2 is a diagram illustrating multiple biological units binding to a single barcode unit. The following symbols are used: (A1, A2) Barcode units; (B1, B2) Biological units; (C) Means for binding biological units; (Y) Biased data; (1) Binding of biological units and barcode units; (2-6) Steps 2 to 6 of FIG. 1.

A crucial step when implementing the method of the present invention is the binding of a single biological unit to a single barcode unit, as to form a 1:1 complex. As shown in FIG. 2, the binding of multiple biological units to a single barcode unit skews the subsequent data retrieved, and in particular, single cell next generation sequencing data. Upon sequence analysis, sequences with "barcode 1" would be biased or corrupted since they are gathered from two distinct biological units.

Figure 3:
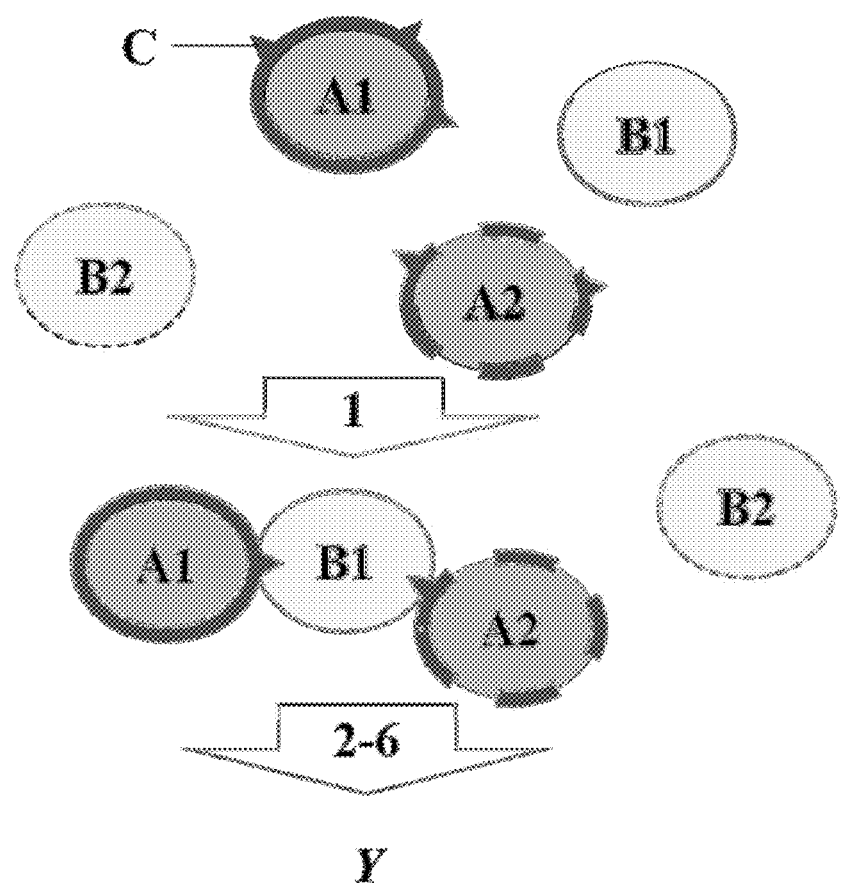
FIG. 3 is a diagram illustrating multiple barcode units binding to a single biological unit. The following symbols are used; (A1, A2) Barcode units; (B1, B2) Biological units; (C) Means for binding biological units; (1) Binding of biological units and barcode units; (2-6) Steps 2 to 6 of FIG. 1.

Likewise, the binding of multiple barcode units to a single biological unit skews the single cell next generation sequencing data (FIG. 3). Sequence data gathered from "biological unit 1" (B1) would be represented twice by "barcode 1" and "barcode 2" (A1 and A2).

Several ways can help avoiding the formation of non-stoichiometric biological unit/barcode unit complexes.

Figure 4:
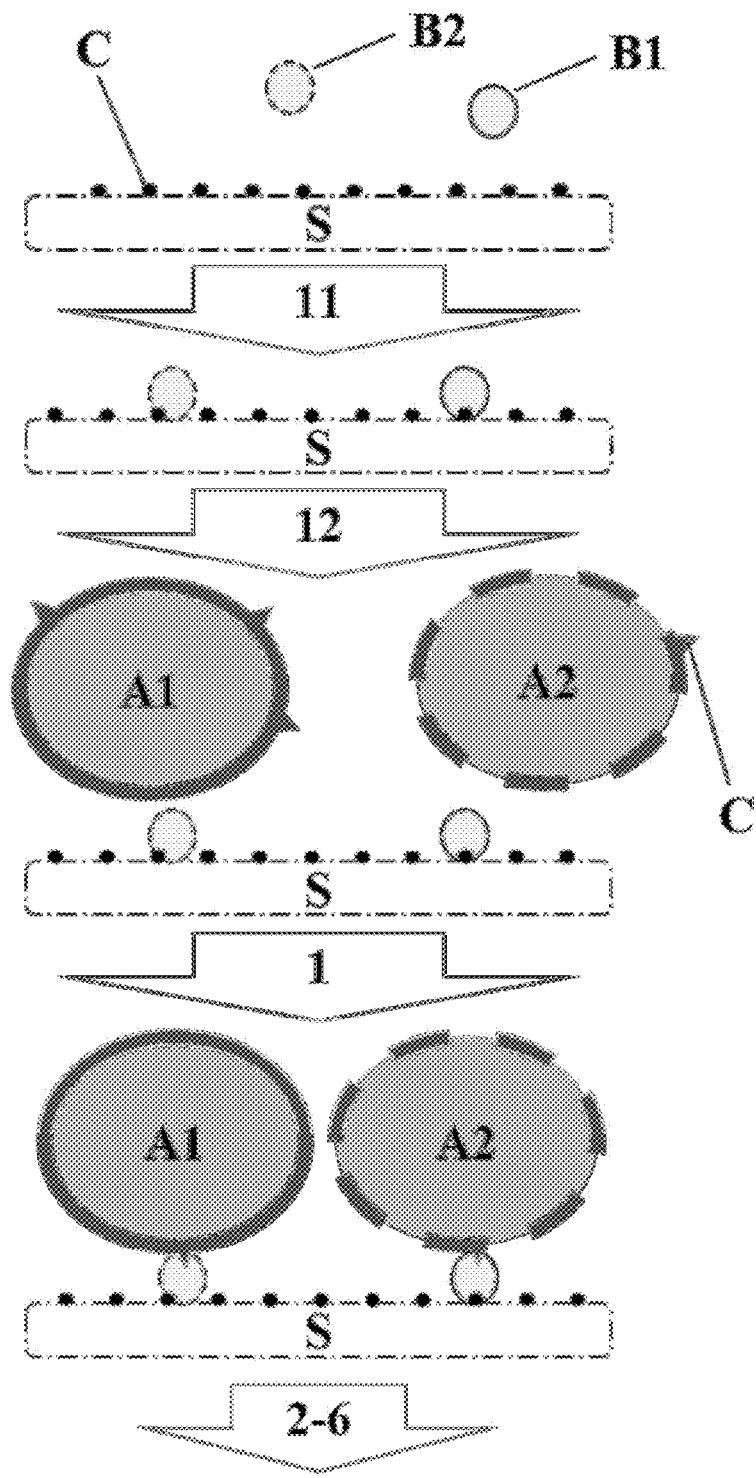
FIG. 4 is a diagram illustrating the binding of biological units to a solid support before binding to barcode units, trapping, and barcoding. Barcode units are significantly larger than biological units, presenting therefore the binding of multiple barcode units to a single biological unit. The following symbols are used: (A1, A2) Barcode units; (B1, B2) Biological units; (C) Means for binding biological units; (S) Solid support; (11) Binding of biological units to solid support; (12) Addition of barcode units in solution; (1) Binding of biological units and barcode units; (2-6) Steps 2 to 6 of FIG. 1.

FIG. 4 shows the immobilization of the biological units of interest on a support, coated with means for binding said biological units (step 11). Once immobilization on the support, biological units can be contacted with barcode units (step 12)—preferentially with barcode units which are larger in size with respect to the biological units, to create hindrance and prevent the binding of multiple barcode unit on a single biological unit (step 1). Therefore, since only one barcode unit is bound per biological unit, it is possible to parse subsequent next generation sequencing data into single biological units.

Such configuration can be easily implemented, using a support such as a microcentrifuge tube coated with a means for binding biological units, such as biotin. Biological units such as cells are contacted with streptavidin-coupled antibodies, then deposited in the tube to allow for binding. Excess cells are removed. Biotin-coated barcode units, such as beads, are then deposited in the tube to allow for binding to the cells. Excess beads are removed. A hydrogel solution is then poured into the tube, such as sodium alginate, together with calcium ions, to allow alginate to polymerize. Trapped cells can then be processed, such as for example by addition of detergent on top of the tube. By capillarity, the detergent reaches the trapped cells and lyse then membrane, releasing their nucleic acid content. Alginate pore size is small enough to avoid diffusion of nucleic acids, while allowing diffusion of smaller reactants and substrates. Barcoding occurs as nucleic acids from a discrete cell are released and attach to the nucleic acid sequence barcode of their adjacent barcode bead. Once the nucleic acids are properly barcoded, the sample can be wash out to remove calcium ions. Alginate hydrogel dissolves, and further steps can be processed directly in the tube, in solution.

Figure 5:
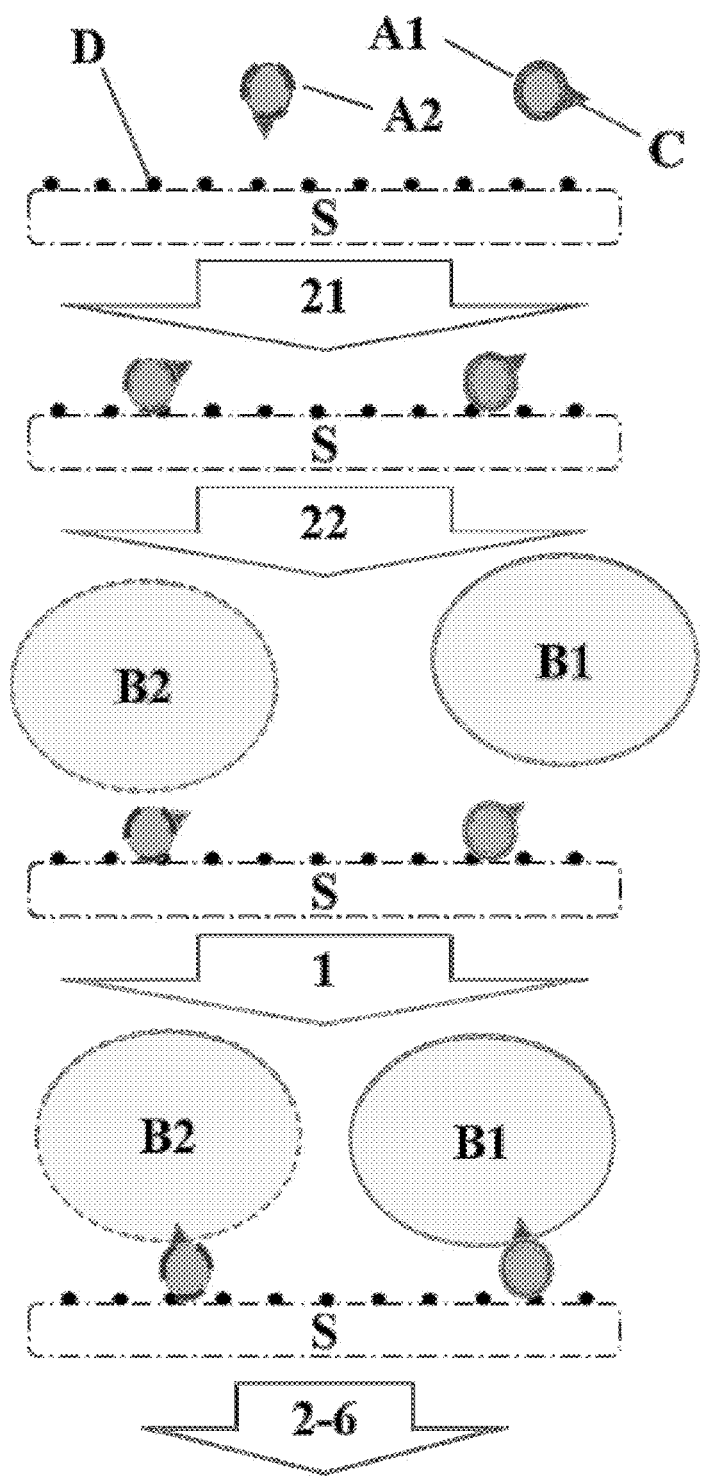
FIG. 5 is a diagram illustrating the binding of barcode units to a solid support before binding to biological units, trapping, and barcoding. Biological units are significantly larger than barcode units, preventing therefore the binding of multiple biologic units to a single barcode unit. The following symbols are used: (A1, A2) Barcode units; (B1, B2) Biological units; (C) Means for binding biological units; (D) Means for binding barcode units; (S) Solid support; (21) Binding of barcode units to solid support; (22) Addition of biological units in solution; (1) Binding of biological units and barcode units, (2-6) Steps 2 to 6 FIG. 1.

Alternatively, barcode units can be bound on a support, coated with means for binding said barcode units. Once bound to the support, barcode units can be contacted with biological units—preferentially with biological units which are larger in size with respect to the barcode units, to create hindrance and prevent the binding of multiple biological units on a single barcode unit (FIG. 5).

Such configuration can also be implemented using a support such as a microcentrifuge tube coated with a thin layer of hydrogel which, upon polymerization, immobilizes barcode units throughout the support. Biological units such as cells are then deposited in the tube to allow for binding to the barcode units (providing that the layer of hydrogel immobilizing the barcode units is thinner than the smallest dimension of the barcode unit, i.e., that at least a part of the barcode unit remains accessible for contacting biological units). Excess cells are removed. A hydrogel solution is then poured into the tube and left polymerizing. Trapped cells can then be processed as described hereinabove. Once the nucleic acids are properly barcoded, both hydrogels (i.e., the thin layer coating the tube and the hydrogel matrix trapping the biological units) can be dissolved, and further steps can be processed directly in the tube, in solution.

Figure 6:
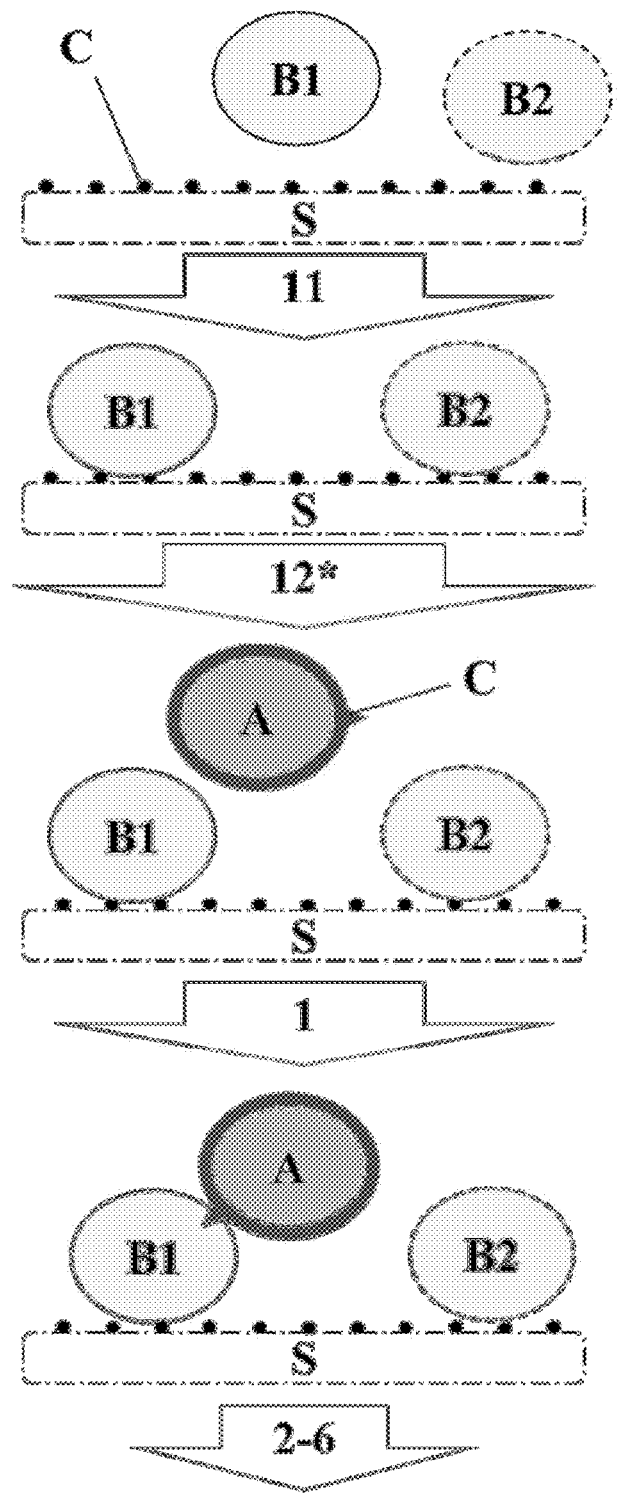
FIG. 6 is a diagram illustrating the binding of biological units to a solid support before binding to barcode units, trapping, and barcoding. Barcode units and biological units are roughly the same size. Barcode units are at limiting dilution to preventing the binding of multiple barcode units to a single biological unit. The following symbols are used: (A) Barcode unit; (B1, B2) Biological units; (C) Means for binding biological units; (S) Solid support; (11) Binding of biological units to solid support; (12*) Addition of barcode units in solution at a limiting concentration; (1) Binding of biological units and barcode units; (2-6) Steps 2 to 6 of FIG. 1.
Figure 7:
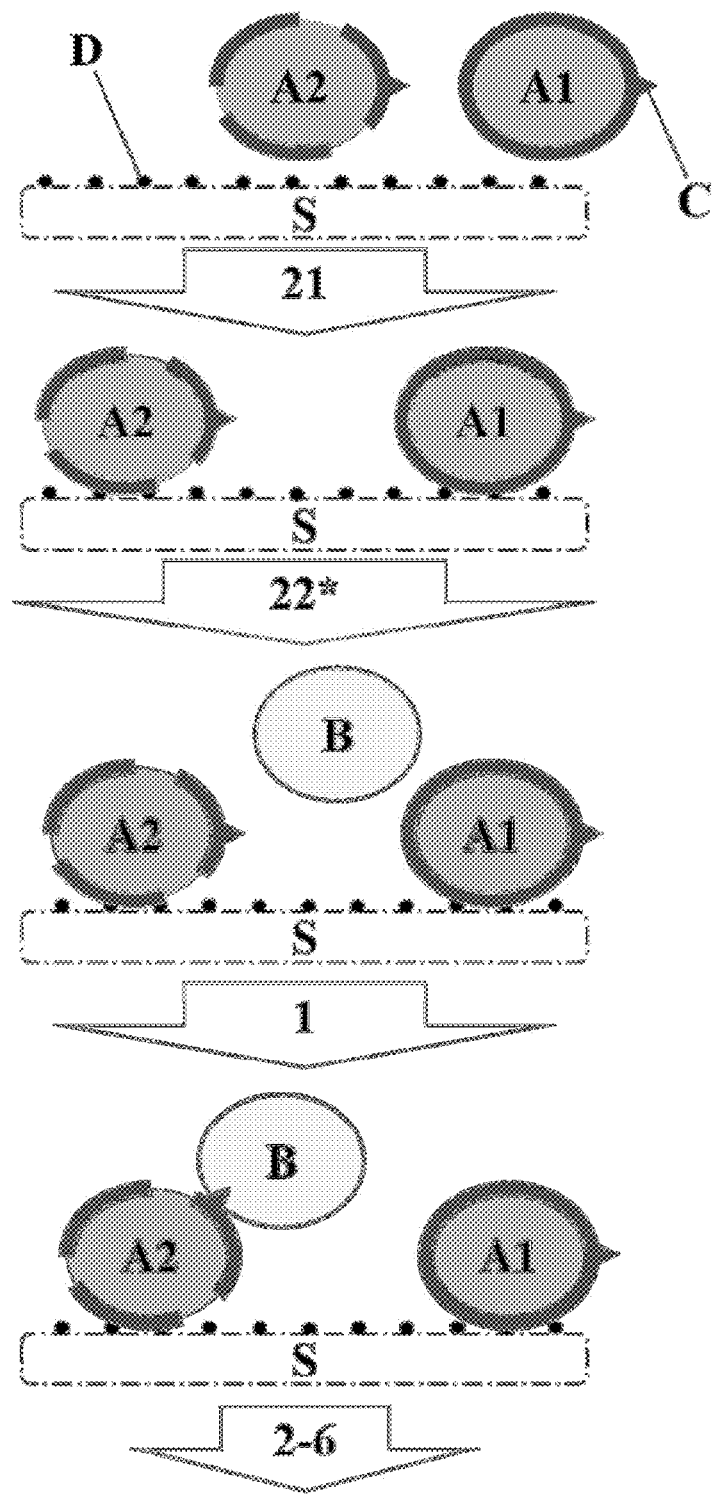
FIG. 7 is a diagram illustrating the binding of barcode units to a solid support before binding to biological units, trapping, and barcoding. Biological units and barcode units are roughly the same size. Biological units are at limiting dilution to preventing the binding of multiple biological units to a single barcode unit. The following symbols are used: (A1, A2) Barcode units; (B) Biological unit; (C) Means for binding biological units; (D) Means for binding barcode units; (S) Solid support; (21) Binding of barcode units to solid support; (22*) Addition of biological units in solution at a limiting concentration, (1) Binding of biological units and barcode units; (2-6) Steps 2 to 6 of FIG. 1.

Another strategy to avoid the formation of non-stoichiometric biological unit/barcode unit complexes is the use of a support where biological units of interest (FIG. 6) or barcode units (FIG. 7) are bound and/or immobilized as described previously, together with limiting concentrations of barcode units or biological units, respectively. Preferably, the concentration of free units (barcode units or biological units, respectively) is lower than the concentration of support-bound units (biological units or barcode units, respectively). This ensures the binding of at most one barcode unit per biological unit and conversely, making it possible to parse subsequent next generation sequencing data into single biological units. Some biological units (step 1 of FIG. 6) or barcode units (step 1 of FIG. 7) are not coupled with a barcode unit or a biological unit, respectively, and therefore do not produce any data.

Example 2

Single-Cell transcriptome Profiling

Figure 8:
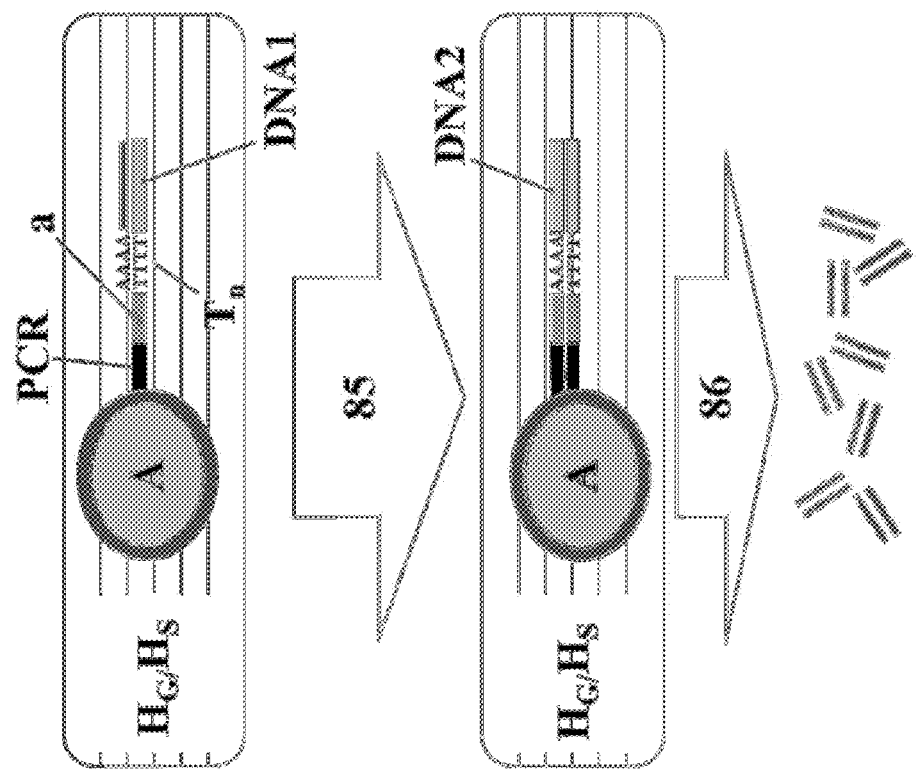
FIG. 8 is a diagram illustrating a possible single cell RNAseq transcriptome workflow, using barcode units comprising an oligonucleotide, itself comprising a poly-dT nucleic acid sequence primer, a unique barcode and a PCR handle. Multiple barcode oligonucleotides are present from the first step, but only one is shown here, as (a), after step 84 for simplicity. Steps 1-3 (1-3) may be performed as in FIG. 1 or may involve a solid support and include therefore the additional steps of FIGS. 4 to 7. The following symbols are used: (A) Barcode unit; (B) Biological unit; ($H_G$) Hydrogel matrix (hydrogel in gel state); ($H_G/H_S$) Hydrogel in solid or gel state; (R) Poly(A) mRNA; (a) barcode; (PCR) PCR handle; ($T_n$) Poly-(T) primer; (DNA1) First strand cDNA; (DNA2) $2^{nd}$ strand cDNA; (83*) Cell lysis by application of a non-ionic detergent, (84) Barcoding, i.e., priming of poly (A) mRNAs with oligo d(T) primer of barcode oligonucleotides: (85) $2^{nd}$ strand cDNA synthesis (optionally through template switching and amplification); (86) Fragmentation, Adaptering, Amplification, Next-Generation sequencing.
Figure 8:
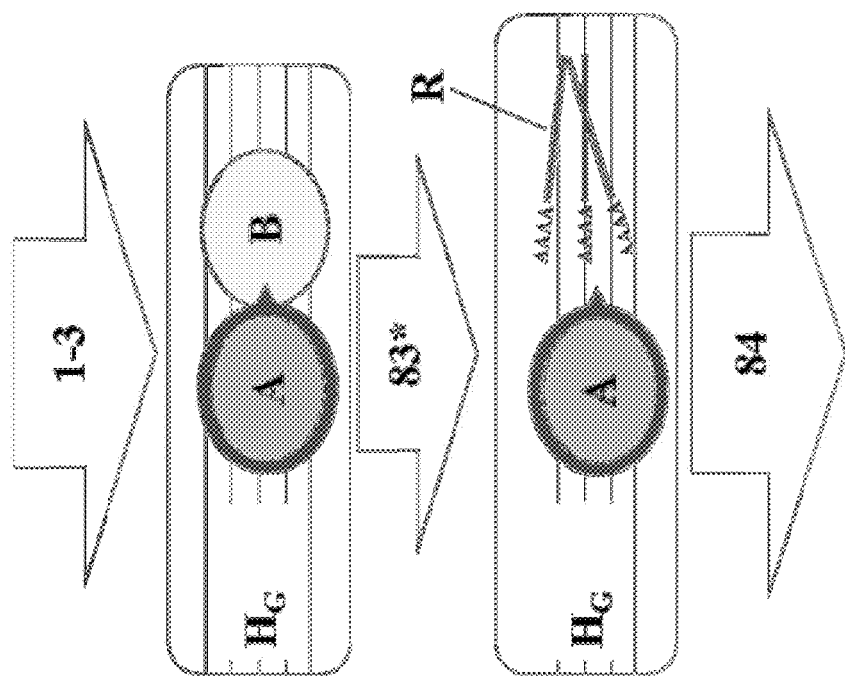

Single-cell transcriptome profiling is one of the numerous biochemistry and molecular biology assays that can be carried out using the method of the present invention (FIG. 8).

After forming biological unit/barcode unit complexes in a hydrogel solution as described in Example 1 (steps 1-3 of FIG. 1: optionally after the additional steps (11 and 12 or 12*, or 21 and 22 or 22*) of any of FIGS. 4-7, the hydrogel is allowed to polymerize, trapping thus biological unit/barcode unit complexes ("1-3" in FIG. 8).

Most commonly, the biological units will be a cell, such as a mammalian cell for example, or any other cell suitable for single-cell transcriptome profiling. Single-cell transcriptome profiling relies on the amplification of a single cell's mRNAs content and its sequencing. A first step is therefore to release the cells' mRNAs content, by lysing the cells directly in the hydrogel. To do so, non-ionic detergents or any other suitable reagent for cell lysis can be applied directly on the hydrogel matrix. By diffusion, the reagent can reach up to the biological units, and lyse them (step 83* of FIG. 8).

The released mRNAs bind in their local environment to the oligonucleotides carried by the barcode units. These oligonucleotides are present in multiple clonal copies on each barcode unit, and are unique as to their sequence from barcode unit to barcode unit. They comprise a PCR handle, a unique barcode sequence, and a nucleic acid sequence primer.

Mammalian mRNAs possess a natural 3' poly(A) sequence, which can therefore prime to a nucleic acid sequence primer comprising a poly(T) sequence (step 84 of FIG. 8). Upon priming (i.e., barcoding), the following molecular biology steps can take place either within the hydrogel matrix or in solution. Typically, first-strand cDNA synthesis will occur in 3' of the barcode unit oligonucleotide, using a reverse transcriptase enzyme.

Second strand cDNA synthesis can then occur, optionally through template switching and amplification (step 85 of FIG. 8). Next steps comprise for example fragmentation of the cDNA library, adaptering, and amplification.

Barcoded, amplified and adaptered products can finally be sequenced by next generation sequencing (step 86 of FIG. 8).

Example 3

Phasing

Figure 9:
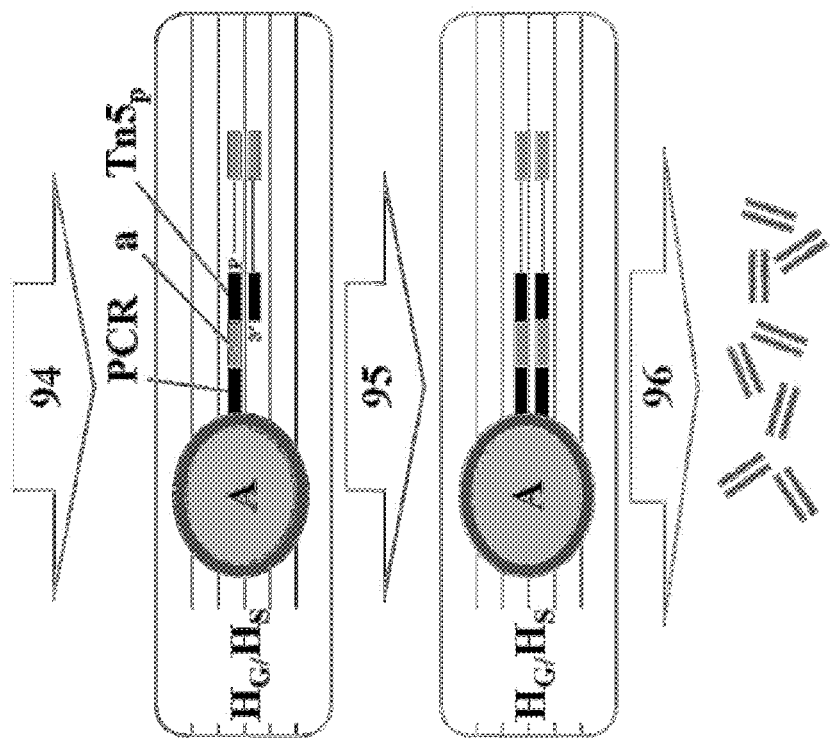
FIG. 9 is a diagram illustrating a possible phasing workflow, using barcode units comprising an oligonucleotide, itself comprising a complementary Tn5 adaptor nucleic acid sequence primer, a unique barcode and a PCR handle. Multiple barcode oligonucleotides are present from the first step, but only one is shown here after step 94 for simplicity. Binding to a solid support of the barcode unit as in FIGS. 5 and 7 or of the transposases as in FIGS. 4 to 6 is possible. The following symbols are used; (A) Barcode unit; (CPT) Contiguity-preserved transposition DNA; (Tn5) Tn5 transposase; (Tn5$_S$) Tn5 adaptor sequence; (a) barcode; (PCR) PCR handle; (Tn5$_P$) Tn5 adaptor primer; (H$_S$) Hydrogel (sol state); (H$_G$) Hydrogel matrix (hydrogel in gel state); (H$_G$/H$_S$) Hydrogel in solid or gel state; (91) Binding transposase to barcode unit: (2) Contacting with hydrogel solution; (3) Polymerization of hydrogel; (94) Release transposase; (95) Ligation, Gap-filling; (96) Amplification, Next-Generation sequencing.
Figure 9:
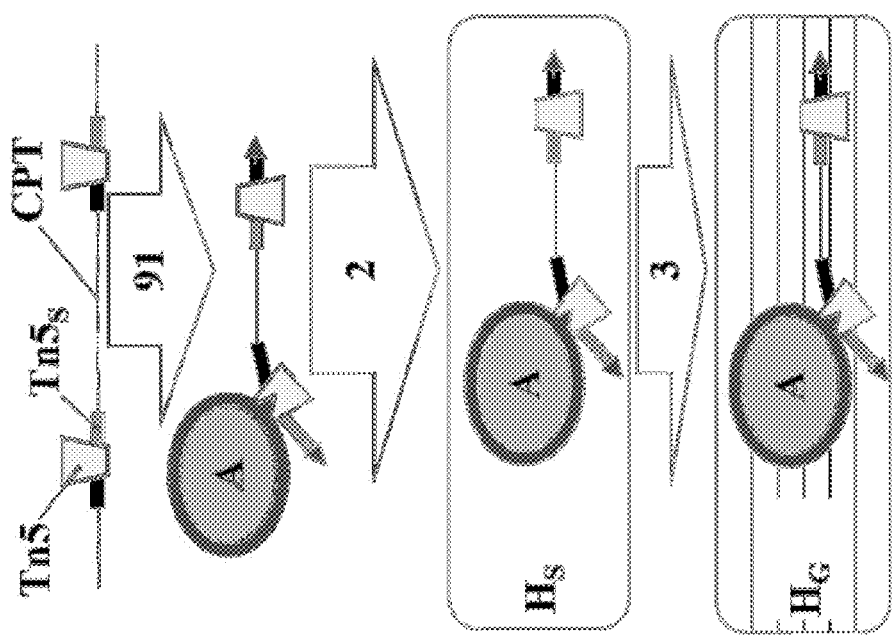

Phasing is another molecular biology assay that can be carried out using the method of the present invention (FIG. 9).

In a first step, transposomes are assembled in solution by mixing a Tn5 transposase with high molecular weight DNA (i.e., the biological unit). This step, sometimes referred to as tagmentation, creates contiguity preserved transposition DNA (CPT-DNA) fragments, and is followed by a second step wherein the transposomes are contacted with barcode units, comprising a means for binding the biological unit (step 91 of FIG. 9). Advantageously, this means binds Tn5 transposases.

The CPT-DNA/barcode unit complexes are then contacted with a hydrogel solution, which is left to polymerize (steps 2-3 of FIG. 9). Once trapped in the hydrogel matrix, the Tn5 transposases are released, using ionic detergents and/or proteinase K, disrupting thus contiguity and yielding DNA fragments comprising a Tn5 adaptor sequence (step 94 of FIG. 9).

The released DNA fragments, comprising a Tn5 adaptor sequence, can prime in their local environment to a nucleic acid sequence primer carried by the barcode units, and comprising a complementary Tn5 adaptor sequence (such as, e.g., SEQ ID NO: 1 or SEQ ID NO: 2). These oligonucleotides are present in multiple clonal copies on each barcode unit, and are unique as to their sequence from barcode unit to barcode arm. They comprise a PCR handle, a unique barcode sequence and a nucleic acid sequence primer, complementary to the Tn5 adaptor sequence (Tn5 adaptor primer, Tn5$_P$). Upon priming (i.e., barcoding), the following molecular biology steps can take place either within the hydrogel matrix or in solution, upon dissolving of the hydrogel.

Ligation, gap-filling and amplification (step 95 of FIG. 9), can occur either in the hydrogel matrix or in solution.

Barcoded, amplified and adaptered products can finally be sequenced by next generation sequencing (step 96 of FIG. 9).

Other variations of molecular biology can be found in international patent application WO2016/061517 (e.g., in FIGS. 15-21), which is hereby incorporated by reference.

The invention claimed is:

1. A method for trapping thousands of biological units in a single hydrogel and barcoding their nucleic acids, said method comprising the steps of:
   a) binding thousands of biological units on thousands of barcode beads, wherein each barcode bead comprises a unique barcode present in multiple clonal copies, and wherein the barcode beads comprise at least one means involved with binding biological units and/or the biological units comprise at least one means involved with binding barcode beads, to form thousands of biological unit/unique barcode bead complexes;
   b) contacting said thousands of complexes with a hydrogel solution;
   c) polymerizing the hydrogel solution to embed, discretely from one another, said thousands of complexes in a single hydrogel matrix formed from the hydrogel solution;
   d) releasing nucleic acids from the biological unit of each biological unit/unique barcode bead complex present in the hydrogel matrix, wherein the hydrogel matrix has a pore size preventing the diffusion of said nucleic acids;
   e) for each biological unit/unique barcode bead complex, annealing the unique barcode of the barcode bead of each biological unit/unique barcode bead complex to the nucleic acids of the biological unit of the same biological unit/unique barcode bead complex;
   f) depolymerizing the hydrogel matrix; and
   g) in-bulk synthetizing a nucleic acid library from the nucleic acids by primer-directed extension of the barcode, wherein the method does not utilize polydimethylsiloxane ("PDMS") chips or droplets to embed the complexes.

2. The method according to claim 1, wherein said method is for analyzing gene expression in thousands of cells, and said method comprises the steps of:
   a) binding thousands of cells with thousands of barcode beads, to form thousands of cell/unique barcode bead complexes,
   b) contacting said thousands of complexes with a hydrogel solution,
   c) polymerizing the hydrogel solution to embed, discretely from one another, said thousands of complexes in a single hydrogel matrix formed from the hydrogel solution,
   d) releasing messenger RNAs from the cells of each cell/unique barcode bead complex present in the hydrogel matrix,
   e) for each cell/unique barcode bead complex, annealing the unique barcode of the barcode bead of each cell/unique barcode bead complex to the messenger RNAs of the cell of the same cell/unique barcode bead complex,
   f) depolymerizing the hydrogel matrix,
   g) in-bulk synthetizing a barcoded cDNA library from the messenger RNAs by primer-directed extension of the barcode, and
   h) sequencing the barcoded cDNA library.

3. The method according to claim 1, wherein said method is for analyzing the genotype or haplotype in thousands of cells, and said method comprises the steps of:
   a) binding thousands of cells with thousands of barcode beads, wherein each barcode unit comprises clonal copies of a unique barcode, to form thousands of cell/unique barcode bead complexes,
   b) contacting said thousands of complexes with a hydrogel solution,
   c) polymerizing the hydrogel solution to embed, discretely from one another, said thousands of complexes in a single hydrogel matrix formed from the hydrogel solution, d) releasing genomic DNA from each cell present in the hydrogel matrix,
e) for each cell/unique barcode bead complex, annealing the unique barcode of the barcode bead with the genomic DNA,
f) depolymerizing the hydrogel matrix,
g) in-bulk synthetizing a barcoded DNA library from the genomic DNA by primer-directed extension of the barcode, and
h) sequencing the barcoded DNA library.

4. The method according to claim 1, wherein said method is for analyzing the epigenome in thousands of cells, and said method comprises the steps of:
a) binding thousands of cells with thousands of barcode beads, wherein each barcode unit comprises clonal copies of a unique barcode, and
   wherein the barcode beads comprise at least one means involved with binding cells and/or the cells comprise at least one means involved with binding barcode beads, to form thousands of cell/unique barcode bead complexes,
b) contacting said thousands of complexes with a hydrogel solution,
c) polymerizing the hydrogel solution to embed, discretely from one another, said thousands of complexes in a single hydrogel matrix formed from the hydrogel solution,
d) releasing non-nucleosome-bound-DNA from the cells of each cell/unique barcode bead complex present in the hydrogel matrix,
e) for each cell/unique barcode bead complex, annealing the unique barcode of the barcode bead with the non-nucleosome-bound-DNA,
f) depolymerizing the hydrogel matrix,
g) in-bulk synthetizing a barcoded non-nucleosome-bound-DNA library from the non-nucleosome-bound-DNA by primer-directed extension of the barcode, and
h) sequencing the barcoded non-nucleosome-bound-DNA library.

5. The method according to claim 1, wherein said biological units are immobilized on a support.

6. The method according to claim 1, wherein said barcode beads are immobilized on a support.

7. The method according to claim 1, wherein said unique barcode comprises a nucleic acid sequence barcode.

8. The method according to claim 1, wherein said unique barcode further comprises a nucleic acid sequence primer.

9. The method according to claim 8, wherein said nucleic acid sequence primer comprises random nucleic acid sequence primers and/or specific nucleic acid sequence primers.

10. The method according to claim 1, wherein said at least a means involved with binding said biological unit comprises proteins, peptides and/or fragments thereof; antibodies and/or fragments thereof; nucleic acids; carbohydrates; vitamins and/or derivatives thereof; coenzymes and/or derivatives thereof; receptor ligands and/or derivatives thereof, and/or hydrophobic groups.

11. The method according to claim 1, wherein said discrete biological units comprise cells, groups of cells, viruses, nuclei, mitochondria, chloroplasts, biological macromolecules, exosomes, chromosomes, contiguity preserved transposition DNA fragments and/or nucleic acid fragments.

12. The method according to claim 11, wherein said cells or groups of cells comprise cells in in vitro culture, stem cells, tumor cells, tissue biopsy cells, blood cells and tissue section cells.

13. The method according to claim 9, wherein the specific nucleic acid sequence primers comprise a poly-dT or poly-dU sequence.

* * * * *

SEQUENCE LISTING

```
<160> NUMBER OF SEQ ID NOS: 2

<210> SEQ ID NO 1
<211> LENGTH: 14
<212> TYPE: DNA
<213> ORGANISM: Artificial Sequence
<220> FEATURE:
<223> OTHER INFORMATION: Nucleic acid sequence primer

<400> SEQUENCE: 1
tcgtcggcag cgtc                                                     14

<210> SEQ ID NO 2
<211> LENGTH: 14
<212> TYPE: DNA
<213> ORGANISM: Artificial Sequence
<220> FEATURE:
<223> OTHER INFORMATION: Nucleic acid sequence primer

<400> SEQUENCE: 2
gtctcgtggg ctcg                                                     14
```